(12) United States Patent
Sueyoshi et al.

(10) Patent No.: US 10,136,245 B2
(45) Date of Patent: Nov. 20, 2018

(54) INFORMATION PROCESSING DEVICE, INFORMATION PROCESSING SYSTEM, INFORMATION PROCESSING METHOD, AND PROGRAM

(71) Applicant: SONY CORPORATION, Tokyo (JP)

(72) Inventors: Masahiro Sueyoshi, Kanagawa (JP); Yoshihiro Yoneda, Tokyo (JP); Naoya Hoshino, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/917,458

(22) PCT Filed: Aug. 7, 2014

(86) PCT No.: PCT/JP2014/004129
§ 371 (c)(1),
(2) Date: Mar. 8, 2016

(87) PCT Pub. No.: WO2015/040783
PCT Pub. Date: Mar. 26, 2015

(65) Prior Publication Data
US 2016/0227353 A1    Aug. 4, 2016

(30) Foreign Application Priority Data

Sep. 18, 2013 (JP) .................. 2013-192915

(51) Int. Cl.
*H04W 4/00* (2018.01)
*G06Q 20/32* (2012.01)
(Continued)

(52) U.S. Cl.
CPC ........ *H04W 4/008* (2013.01); *G06Q 20/3278* (2013.01); *H04L 63/08* (2013.01);
(Continued)

(58) Field of Classification Search
USPC .............................. 455/41.1, 41.2, 557, 558
See application file for complete search history.

(56) References Cited

U.S. PATENT DOCUMENTS

2004/0110533 A1* 6/2004 Yamagata ............. G06F 13/385
455/558
2004/0247023 A1* 12/2004 Sasai ................... H04L 63/0492
375/220

(Continued)

FOREIGN PATENT DOCUMENTS

| JP | 2000-222552 | 8/2000 |
| JP | 2002-324214 | 11/2002 |

(Continued)

OTHER PUBLICATIONS

Jan. 27, 2017, SG communication for related SG application No. 11201601845S.

(Continued)

*Primary Examiner* — Ganiyu A Hanidu
(74) *Attorney, Agent, or Firm* — Paratus Law Group, PLLC

(57) ABSTRACT

There is provided an apparatus including a circuitry configured to initiate a reception of an information request that has been wirelessly transmitted from an information processing terminal, initiate, based on the information request, an obtaining of an information wirelessly from an external communication device, and initiate a wireless transmission of the obtained information to the information processing terminal.

21 Claims, 9 Drawing Sheets

(51) Int. Cl.
  *H04M 1/725* (2006.01)
  *H04L 29/06* (2006.01)
  *H04W 12/06* (2009.01)
  *H04W 4/80* (2018.01)
  *H04W 76/27* (2018.01)

(52) U.S. Cl.
  CPC .......... *H04L 63/10* (2013.01); *H04M 1/7253* (2013.01); *H04W 4/80* (2018.02); *H04W 12/06* (2013.01); *H04W 76/27* (2018.02)

(56) References Cited

U.S. PATENT DOCUMENTS

| | | | | |
|---|---|---|---|---|
| 2006/0015739 | A1* | 1/2006 | Suzuki | G07C 9/00111 713/182 |
| 2006/0218196 | A1* | 9/2006 | Kurita | G06Q 20/341 |
| 2008/0067249 | A1* | 3/2008 | Nakatsugawa | G06Q 20/32 235/451 |
| 2009/0129745 | A1* | 5/2009 | Kinoshita | H04N 5/782 386/299 |
| 2010/0115268 | A1* | 5/2010 | Kudo | H04L 63/0815 713/156 |
| 2010/0179872 | A1* | 7/2010 | Fujita | G06Q 30/0238 705/14.38 |
| 2011/0113477 | A1* | 5/2011 | Miyabayashi | H04L 63/0492 726/7 |
| 2012/0282860 | A1* | 11/2012 | Sasai | H04W 56/002 455/41.3 |
| 2012/0296986 | A1 | 11/2012 | Hassan et al. | |
| 2013/0040563 | A1* | 2/2013 | Kim | G06Q 20/3572 455/41.1 |
| 2013/0110657 | A1 | 5/2013 | Forster | |
| 2013/0152185 | A1 | 6/2013 | Singh et al. | |
| 2014/0076967 | A1* | 3/2014 | Pushkin | G06Q 20/3272 235/380 |

FOREIGN PATENT DOCUMENTS

| | | |
|---|---|---|
| JP | 2003-244290 | 8/2003 |
| JP | 2003-317072 | 11/2003 |
| JP | 2005-128601 | 5/2005 |
| JP | 2006-060392 | 3/2006 |
| JP | 2006-254346 | 9/2006 |
| JP | 2007-065960 | 3/2007 |
| JP | 2008-123476 | 5/2008 |

OTHER PUBLICATIONS

Feb. 21, 2017, JP communication for related JP application No. 2013-192915.
Sep. 19, 2017, Japanese Office Action issued for related JP application No. 2013-192915.

* cited by examiner

[Fig. 1]
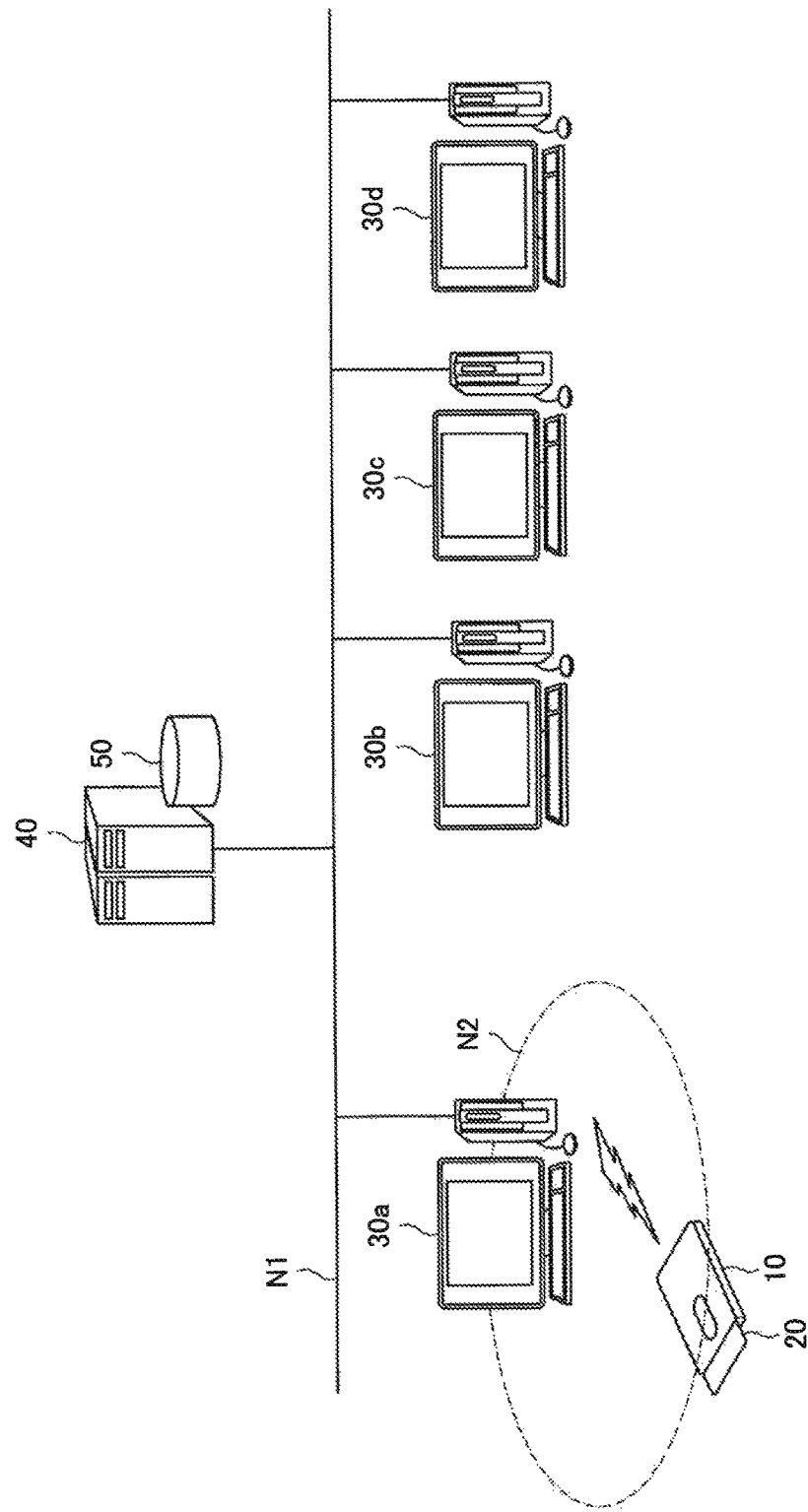

[Fig. 2]
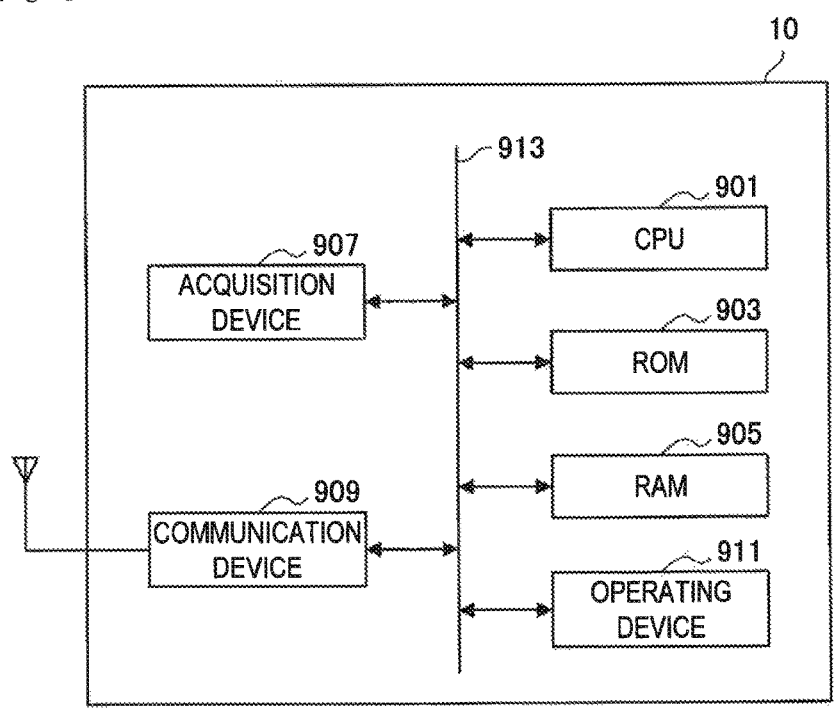

[Fig. 3]
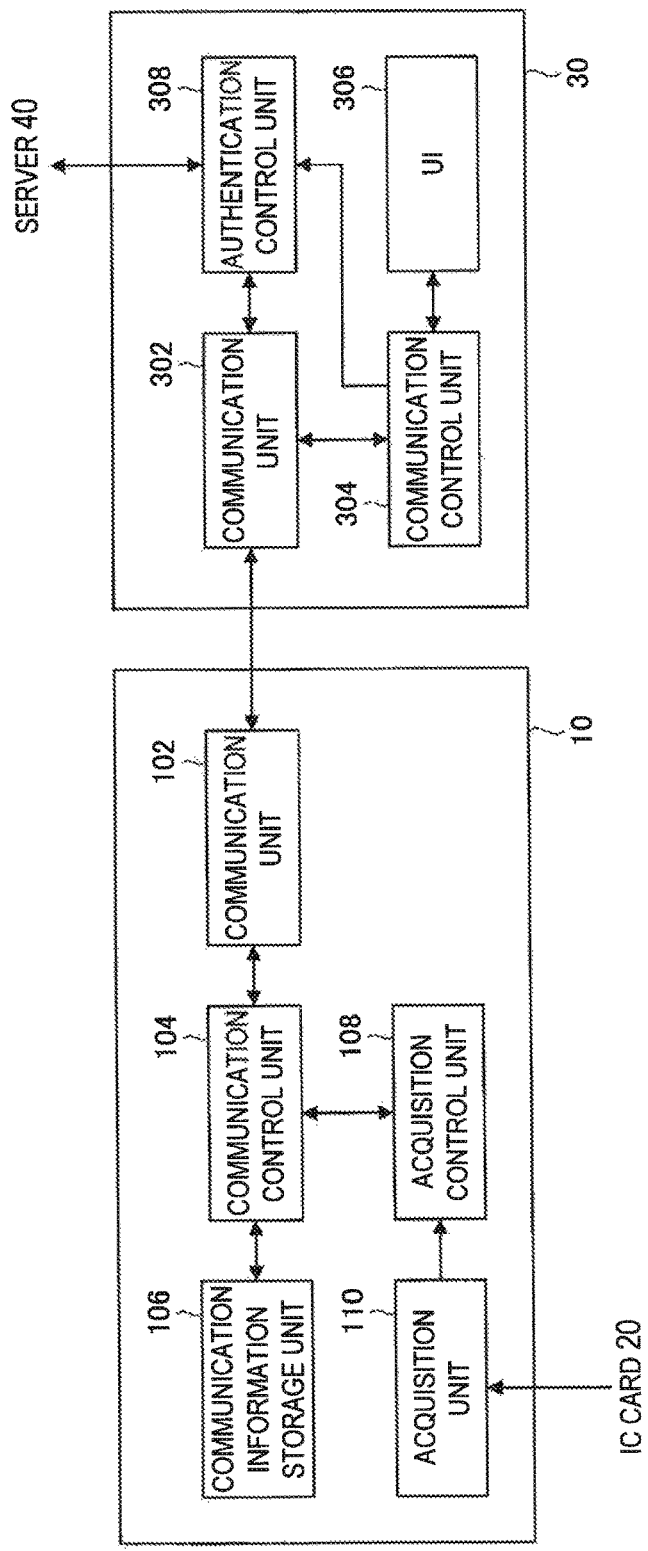

[Fig. 4]
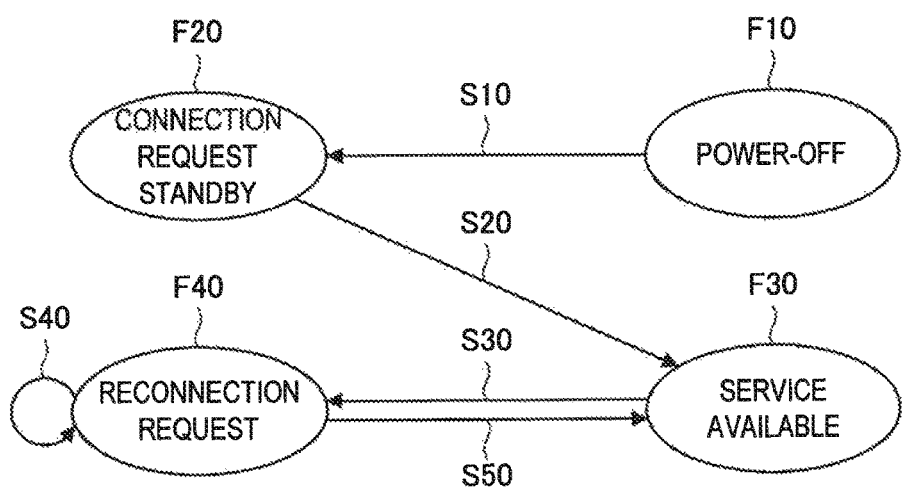
[Fig. 5]
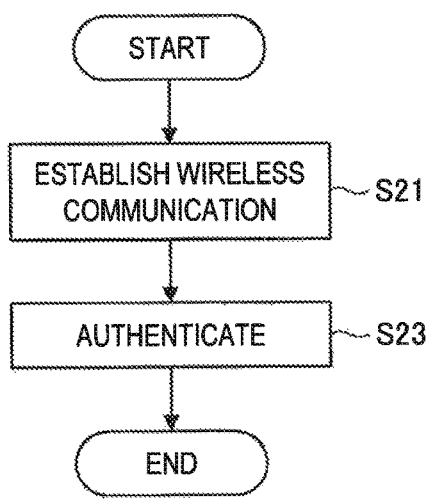

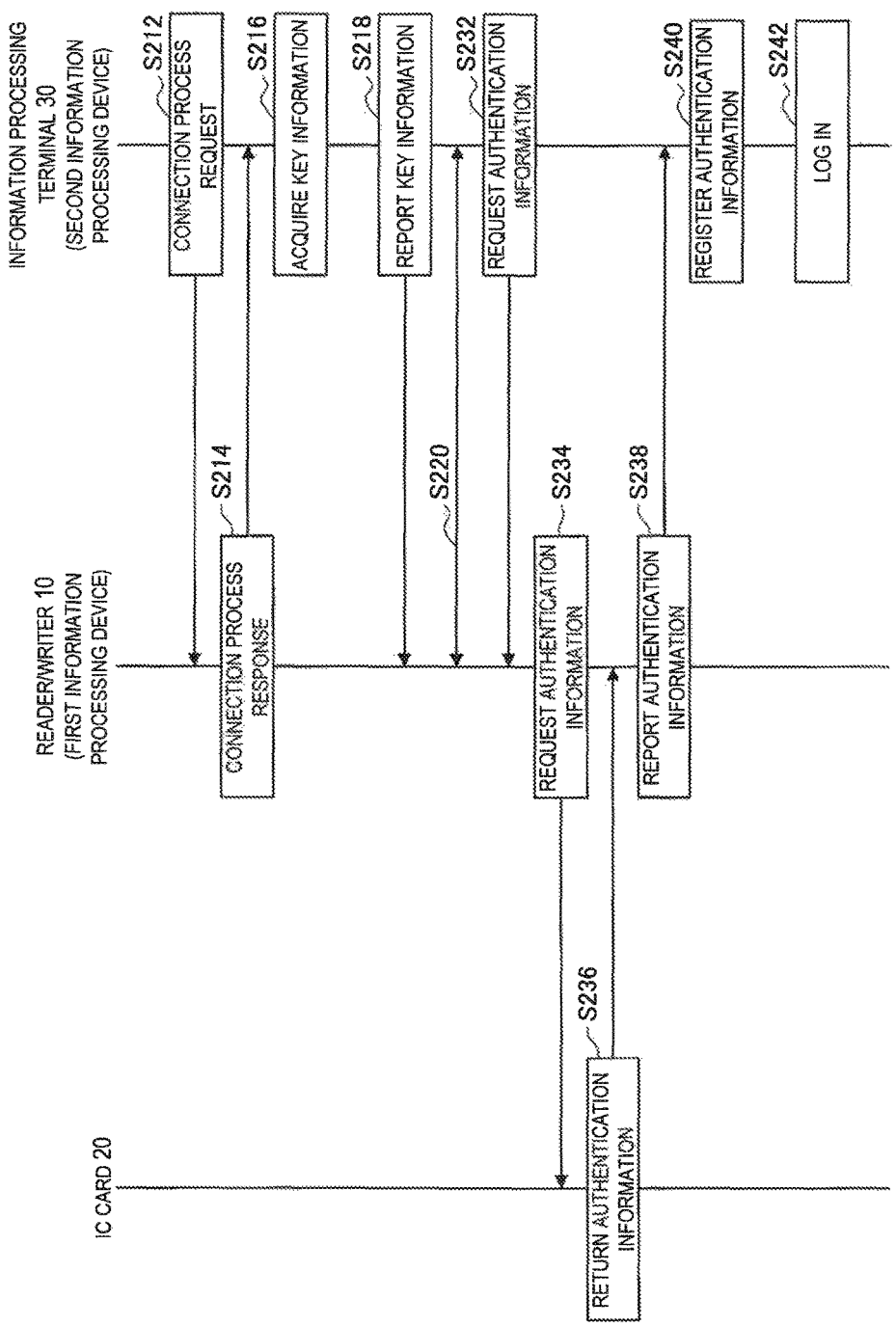

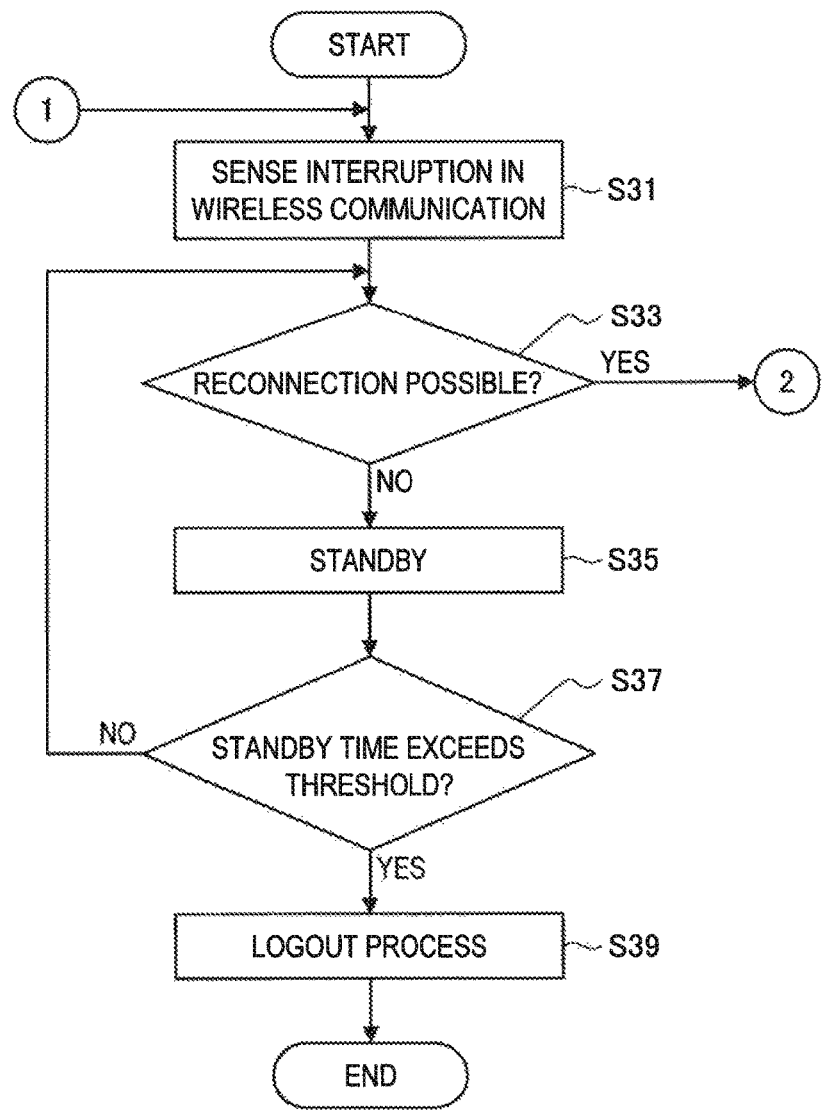
[Fig. 7]

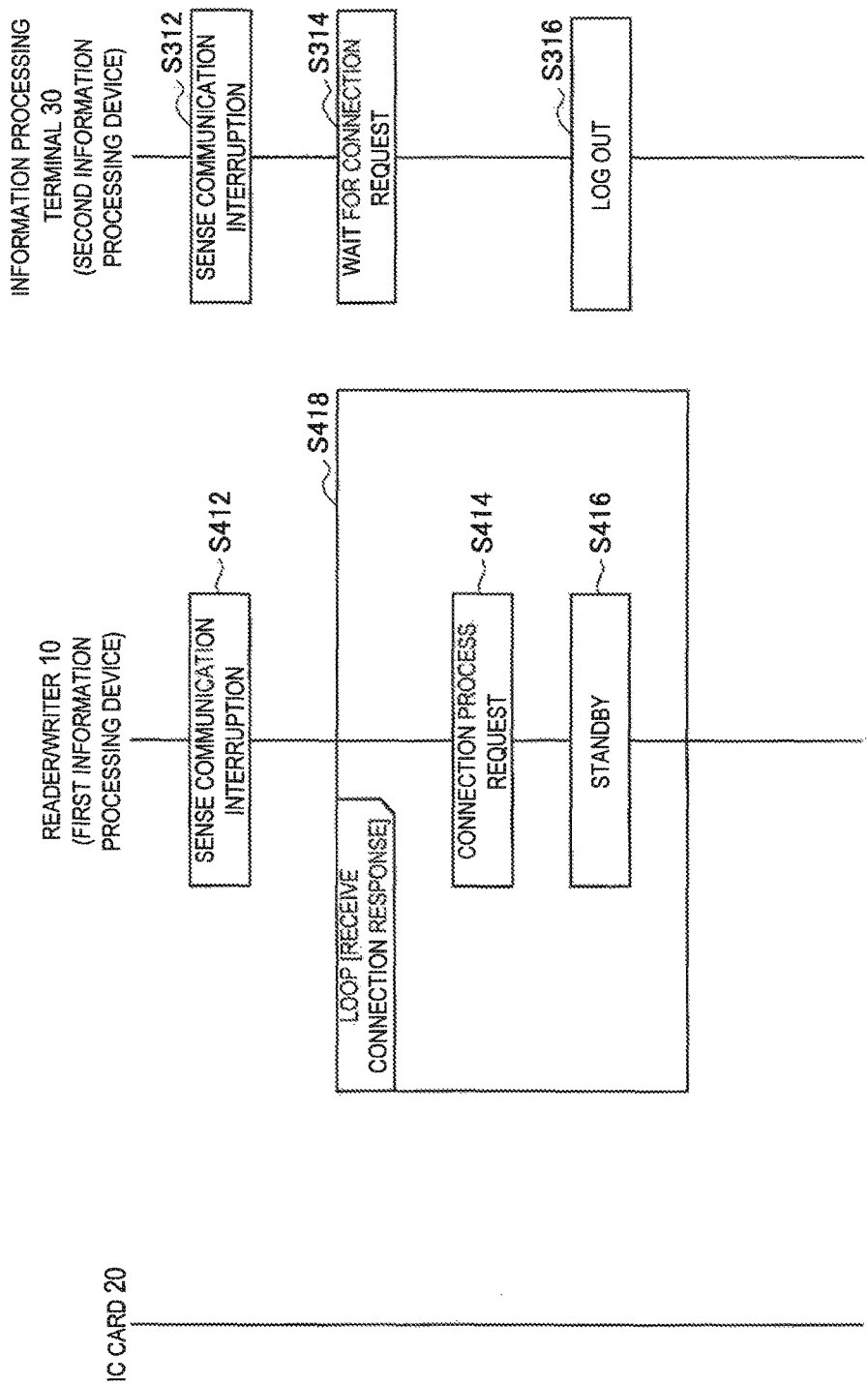

[Fig. 9]
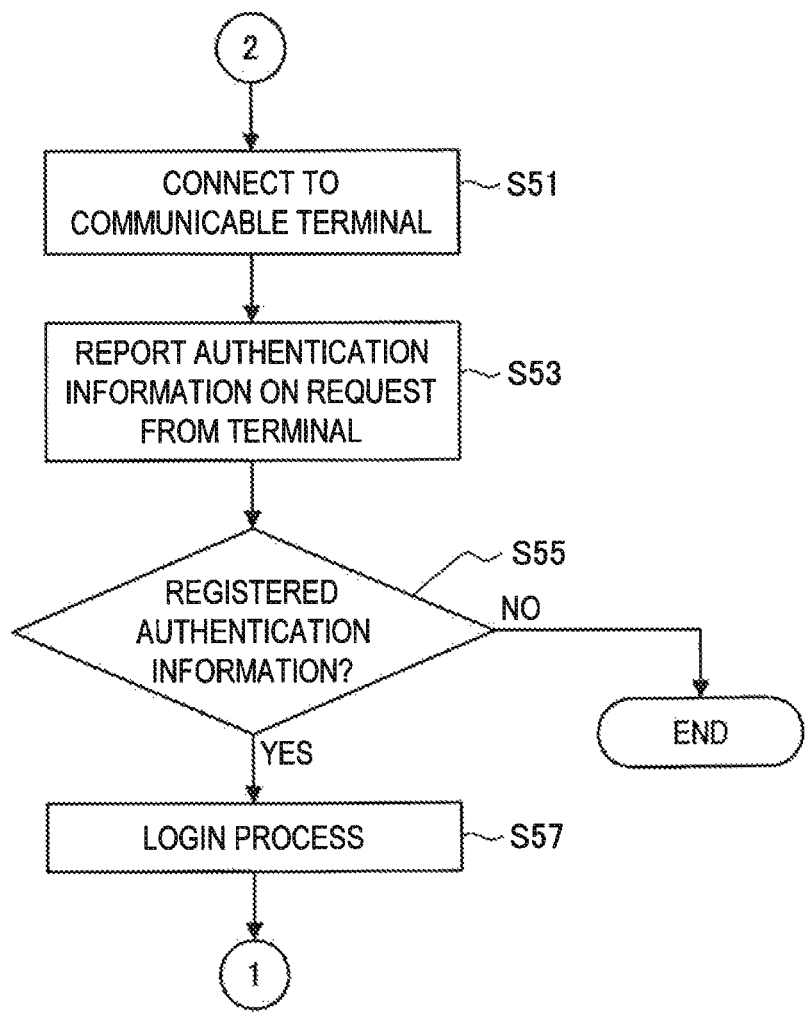

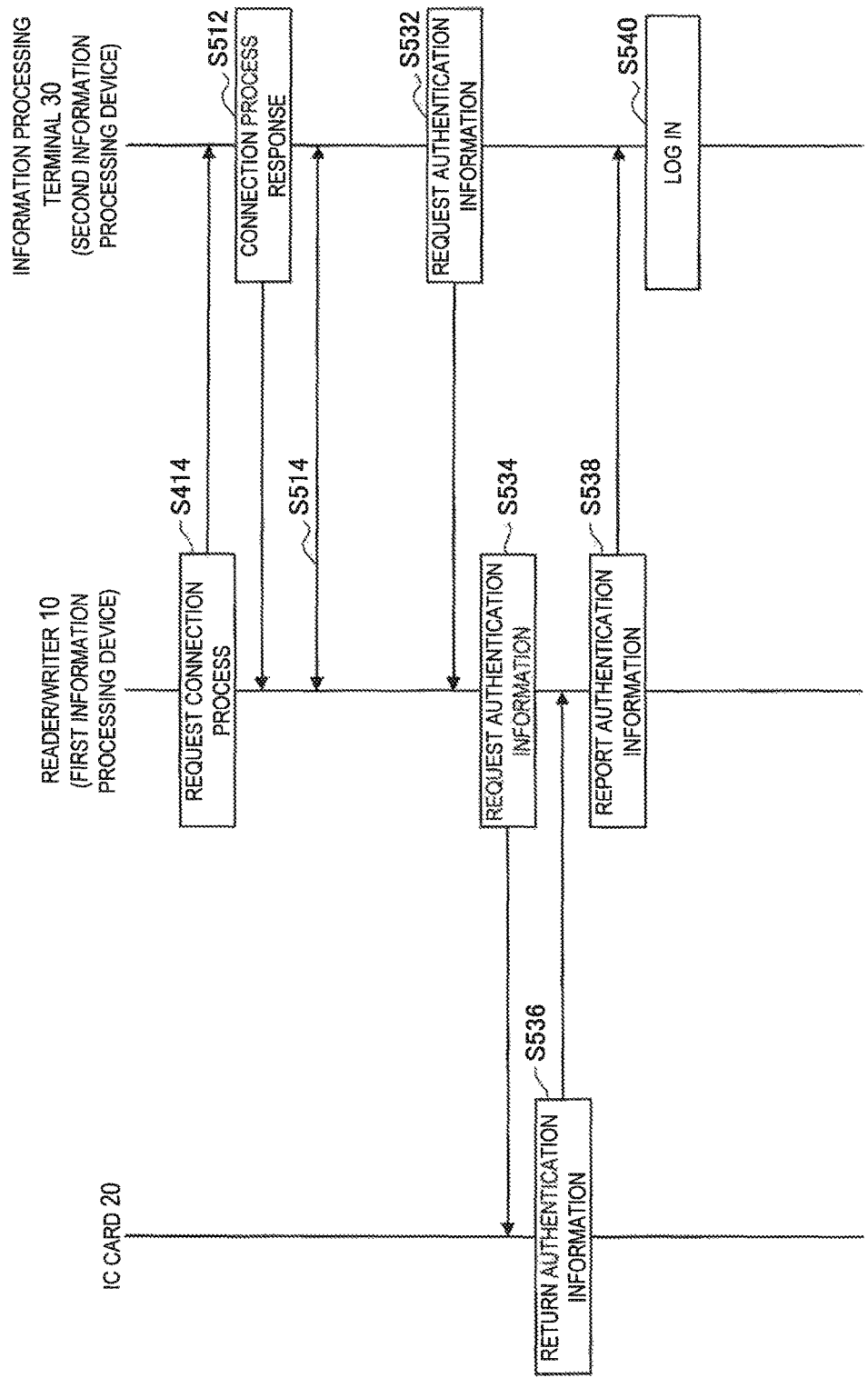

INFORMATION PROCESSING DEVICE, INFORMATION PROCESSING SYSTEM, INFORMATION PROCESSING METHOD, AND PROGRAM

CROSS REFERENCE TO RELATED APPLICATIONS

This application is a National Stage Patent Application of PCT International Patent Application No. PCT/PCT/JP2014/004129 filed Aug. 7, 2014 under 35 U.S.C. § 371, which claims the benefit of Japanese Priority Patent Application JP 2013-192915 filed Sep. 18, 2013, the entire contents of which are all incorporated herein by reference.

TECHNICAL FIELD

The present disclosure relates to an information processing device, an information processing system, an information processing method, and a program.

BACKGROUND ART

There exists technology that simply and easily logs into or logs out of a designated device or system (hereinafter collectively referred to as an "external device" in some cases) by inserting or removing a medium storing authentication information (an IC card or USB memory, for example) into or out of a designated slot, without complicated operations such as inputting authentication information.

Also, in recent years, wireless communication technologies such as communication technology based on near field communication (NFC) and radio-frequency identification (RFID) technology are being used in some cases to transmit and receive information between a medium such as an IC card and an external device. In such systems utilizing NFC and REID technology, a user is able to hold up the medium to a reader/writer to thereby report authentication information recorded on that medium to an external device via the reader/writer.

CITATION LIST

Patent Literature

PTL 1: JP 2008-123476A

SUMMARY

Technical Problem

Meanwhile, there is demand for technology that logs into or logs out of a system with a simpler and easier method.

Accordingly, the present disclosure proposes anew and improved information processing device, information processing system, information processing method, and program enabling a simplification of the user burden related to inputting authentication information into an external device.

Solution to Problem

According to an aspect of the present disclosure, there is provided an apparatus including a circuitry configured to initiate a reception of an information request that has been wirelessly transmitted from an information processing terminal, initiate, based on the information request, an obtaining of an information wirelessly from an external communication device, and initiate a wireless transmission of the obtained information to the information processing terminal.

According to another aspect of the present disclosure, there is provided an information processing method including receiving an information request that has been wirelessly transmitted from an information processing terminal, obtaining, based on the information request, an information from an external communication device wherein the information is received from the external communication device through wireless communication, and wirelessly transmitting the obtained information to the information processing terminal.

According to another aspect of the present disclosure, there is provided

According to another aspect of the present disclosure, there is provided a non-transitory computer-readable medium having embodied there a program, which when executed by a computer causes the computer to perform a method, the method including receiving an information request that has been wirelessly transmitted from an information processing terminal, obtaining, based on the information request, an information from an external communication device wherein the information is received from the external communication device through wireless communication, and wirelessly transmitting the obtained information to the information processing terminal.

According to another aspect of the present disclosure, there is provided an information processing apparatus including a circuitry configured to initiate a wireless transmission of an information request to an apparatus upon a detection that the apparatus has entered a communication range of the information processing apparatus, initiate a reception of an authentication information, which is responsive to the information request and has been wirelessly transmitted from the apparatus, and initiate an execution of an authentication process, based on the received authentication information, for granting access to a service executing on the information processing terminal.

According to another aspect of the present disclosure, there is provided an information processing method including wirelessly transmitting an information request from an information processing apparatus to an apparatus upon a detection that the apparatus has entered a communication range of the information processing apparatus, receiving an authentication information, which is responsive to the information request and has been wirelessly transmitted from the apparatus, and executing an authentication process, based on the received authentication information, for granting access to a service executing on the information processing terminal.

According to another aspect of the present disclosure, there is provided a non-transitory computer-readable medium having embodied there a program, which when executed by a computer causes the computer to perform a method, the method including wirelessly transmitting an information request from an information processing apparatus to an apparatus upon a detection that the apparatus has entered a communication range of the information processing apparatus, receiving an authentication information, which is responsive to the information request and has been wirelessly transmitted from the apparatus, and executing an authentication process, based on the received authentication information, for granting access to a service executing on the information processing terminal.

According to another aspect of the present disclosure, there is provided a system including an information processing apparatus and an apparatus, wherein the information processing apparatus includes a circuitry configured to initiate a wireless transmission of an information request to the apparatus upon a detection that the apparatus has entered a communication range of the information processing apparatus, initiate a reception of an authentication information, which is responsive to the information request and has been wirelessly transmitted from the apparatus, and initiate an execution of an authentication process, based on the received authentication information, for granting access to a service executing on the information processing terminal, and wherein the apparatus includes a circuitry configured to initiate a reception of the information request that has been wirelessly transmitted from the information processing terminal, initiate, based on the information request, an obtaining of the authentication information wirelessly from an external communication device, and initiate the wireless transmission of the obtained authentication information to the information processing terminal.

Advantageous Effects of Invention

According to the present disclosure as described above, there is provided an information processing device, an information processing system, an information processing method, and a program enabling a simplification of the user burden related to inputting authentication information into an external device.

Note that the above advantageous effects are not strictly limiting, and that any advantageous effect indicated in the present disclosure or another advantageous effect that may be reasoned from the present disclosure may also be exhibited in addition to, or instead of, the above advantageous effects.

BRIEF DESCRIPTION OF DRAWINGS

FIG. 1 is a diagram illustrating an example of a schematic system configuration of an information processing system according to an embodiment of the present disclosure.

FIG. 2 is a diagram illustrating an example of a hardware configuration of a reader/writer according to an embodiment.

FIG. 3 is a block diagram illustrating an example of a functional configuration of an information processing system according to an embodiment.

FIG. 4 is a state transition diagram illustrating state transitions of a reader/writer according to an embodiment.

FIG. 5 is a flowchart illustrating a schematic process flow in an information processing system according to an embodiment.

FIG. 6 is a sequence diagram illustrating a detailed flow of operations in an information processing system according to an embodiment.

FIG. 7 is a flowchart illustrating a schematic process flow in an information processing system according to an embodiment.

FIG. 8 is a sequence diagram illustrating a detailed flow of operations in an information processing system according to an embodiment.

FIG. 9 is a flowchart illustrating a schematic process flow in an information processing system according to an embodiment.

FIG. 10 is a sequence diagram illustrating a detailed flow of operations in an information processing system according to an embodiment.

DESCRIPTION OF EMBODIMENTS

Hereinafter, embodiments of the present disclosure will be described in detail and with reference to the attached drawings. Note that, in this specification and the appended drawings, structural elements that have substantially the same function and structure are denoted with the same reference numerals, and repeated explanation of these structural elements is omitted.

Hereinafter, the description will proceed in the following order.
1. Overview of information processing system
2. Hardware configuration of reader/writer
3. Functional configuration of information processing system
4. Process flows
5. Conclusion

1. OVERVIEW OF INFORMATION PROCESSING SYSTEM

First, the challenges of an information processing system 1 according to an embodiment will be summarized. An information processing system 1 according to an embodiment aims to simplify the user burden related to inputting authentication information into an external device such as a designated device or system in order to log into or log out of a system with a simpler and easier method.

As a comparative example to such a system, consider a system that achieves system login/logout by inserting or removing a medium such as an IC card or USB memory storing authentication information into or out of a designated slot. Also, in recent years, wireless communication technologies such as NFC and RFID technology are being used in some cases to transmit and receive information between a medium such as an IC card and an external device. In such systems utilizing NFC and RFID technology, a user is able to hold up the medium to a reader/writer to thereby report authentication information recorded on that medium to an external device via the reader/writer.

On the other hand, the case of logging into or logging out of a system by inserting or removing a medium such as an IC card or USB memory requires the user to perform the explicit operation of inserting or removing the medium. This is because the medium needs to be inserted into the slot in order for the reader provided inside the slot to read out authentication information stored on the medium, or in other words, to establish a link for transmitting and receiving authentication information between the reader and the medium.

The above is also similar for systems utilizing NFC or RFID technology. In other words, in a system utilizing NFC or RFID technology, a user needs to perform the explicit operation of holding up a medium such as an IC card to a reader/writer in the case of logging into or logging out of the system.

Accordingly, an information processing system 1 according to an embodiment achieves system login/logout with a simpler and easier method, without performing operations such as inserting or removing a medium such as an IC card or USB memory, or holding up a medium to a reader/writer.

Next, a schematic system configuration of an information processing system 1 according to an embodiment of the present disclosure will be described with reference to FIG. 1. FIG. 1 is a diagram illustrating an example of a schematic system configuration of an information processing system 1 according to an embodiment of the present disclosure.

As illustrated in FIG. 1, an information processing system 1 according to an embodiment includes a reader/writer 10, an IC card 20, information processing terminals 30a to 30d, a server 40, and a database 50.

The information processing terminals 30a to 30d and the server 40 are communicably connected to each other via a network N1. The specifications of the network N1 are not limited insofar as the network connects different devices to each other, and may be the Internet, a local area network (LAN), or a wide area network (WAN), for example.

Each of the information processing terminals 30a to 30d is a terminal for logging into a designated system. Note that the "designated system" may refer to an operating system (OS) installed on each of the information processing terminals 30a to 30d, or a system that operates on a server accessible by the information processing terminals 30a to 30d via the network N1. Note that hereinafter, in some cases the information processing terminals 30a to 30d may simply be designated the "information processing terminal 30" when not being particularly distinguished.

The server 40, on the basis of operations from the information processing terminal 30, registers a user's authentication information or authenticates that user in order for the user to log into the designated system. The server 40 may also execute a process related to logging into or logging out of the designated system. In addition, the database 50 manages and stores per-user authentication information for logging into the designated system.

Specifically, the server 40, on the basis of a request related to authentication information registration from the information processing terminal 30, acquires authentication information to be registered from that information processing terminal 30, and registers the acquired authentication information in the database 50.

In addition, the server 40, on the basis of a request related to user authentication from the information processing terminal 30, acquires authentication information from that information processing terminal 30, and by comparing the acquired authentication information to authentication information stored in the database 50, authenticates the user indicated by the authentication information. If the authentication is successful, the server 40 may also execute a process related to logging the user indicated by the authentication information into the designated system.

In addition, during a state in which a user indicated by authentication information is logged into the designated system, if the server 40 receives a request related to logging out that user from the information processing terminal 30, the server 40 executes a process related to logging out that user from the system.

On the IC card 20, information related to authentication for logging into the designated system is recorded in advance. As a specific example, an IC chip is embedded into the IC card 20, and information related to authentication is stored in the IC chip. Note that the information related to authentication may be the authentication information itself for logging into the designated system, or other information that indirectly indicates the authentication information (for example, information encoding the authentication information). Herein, authentication information includes an ID (or user name) for identifying a user, and a password for authenticating that user, for example.

The reader/writer 10 is configured to be able to read out information related to authentication recorded on the IC card 20. As a specific example, the reader/writer 10 communicates with the IC card 20 using a wireless communication technology such as NFC-based communication technology or RFID technology, and acquires information related to authentication recorded on the IC card 20 from the IC card 20. In this case, the reader/writer 10 fulfills the role of an NFC reader/writer for acquiring information recorded on the IC card 20. Additionally, an NFC tag is provided in the IC card 20, and authentication information is stored in the NFC tag. In other words, the reader/writer 10 reads out authentication information recorded in the NFC tag of the IC card 20. Note that hereinafter, the description assumes that authentication information is recorded on the IC card 20 as the information related to authentication.

In addition, the reader/writer 10 may also be configured to be portable together with the IC card 20 by a user. Note that the reader/writer 10 may also be provided with a structure able to affix the IC card 20 to the reader/writer 10 itself. In this way, by providing a structure for affixing the IC card 20, a user becomes able to carry the reader/writer 10 and the IC card 20 as a single object.

In addition, the reader/writer 10 and the information processing terminal 30 are able to wirelessly communicate with each other. For the wireless communication between the reader/writer 10 and the information processing terminal 30, wireless communication capable of transmitting and receiving information between devices at distances from several meters to several dozen meters may be used. Specific examples of such wireless communication include communication based on IEEE 802.15, such as Bluetooth (registered trademark), and communication based on IEEE 802.11, such as Wi-Fi (registered trademark). Note that the reader/writer 10 corresponds to an example of a "first information processing device". Also, the information processing terminal 30 corresponds to an example of a "second information processing device".

Note that the allowable communication distance between the reader/writer 10 and the information processing terminal 30 may also be appropriately modified to match the usage scenario of a service applying the information processing system 1. In this case, the distance over which wireless communication between the reader/writer 10 and the information processing terminal 30 is available may not be limited to distances from several meters to several dozen meters. Obviously, it may be necessary to appropriately select the communication scheme applied to the wireless communication between the reader/writer 10 and the information processing terminal 30 according to the allowable distance of wireless communication between the reader/writer 10 and the information processing terminal 30.

The reference sign N2 in FIG. 1 schematically indicates the range within which the information processing terminal 30a is able to wirelessly communicate with an external device. (hereinafter called the "communication image of the information processing terminal 30" in some cases). In other words, in the case in which the reader/writer 10 is positioned within the communication range N2 of the information processing terminal 30, information may be transmitted and received to and from that information processing terminal 30 by wireless communication.

Based on a configuration like the above, in the case in which a reader/writer 10 with an inserted IC card 20 enters the communication range N2 of an information processing terminal 30, that information processing terminal 30 acquires authentication information recorded on the IC card 20 from the reader/writer 10 via wireless communication. Note that hereinafter, unless specifically stated otherwise, the term "reader/writer 10" will refer to a reader/writer 10 with an IC card 20 inserted therein. Similarly, unless specifically stated otherwise, the term "IC card 20" will refer to an IC card 20 inserted into a reader/writer 10.

Specifically, in the case in which the reader/writer 10 enters the communication range N2 of an information processing terminal 30, that information processing terminal 30 requests the reader/writer 10 to report authentication information. Upon receiving this request, the reader/writer 10 acquires authentication information from the inserted IC card 20 on the basis of the request from the information processing terminal 30, and reports the acquired authentication information to that information processing terminal 30. Consequently, an information processing terminal 30 acquires authentication information recorded on an IC card 20 from a reader/writer 10 positioned inside the communication range N2 of that information processing terminal 30.

Additionally, on the basis of the authentication information acquired from the reader/writer 10, the information processing terminal 30 executes a process related to authentication for logging into a designated system.

According to such a configuration, a user becomes able to carry an IC card 20 storing his or her own authentication information inserted into a reader/writer 10 in advance, and log into a designated system by entering the communication range N2 of an information processing terminal 30, without performing complicated operations.

In addition, in the case in which the reader/writer 10 departs the communication range N2 of an information processing terminal 30, that information processing terminal 30 senses the departure of the reader/writer 10 from the communication range N2, and stands by for a connection request from the departed reader/writer 10. At this point, in the case of not receiving a connection request from the reader/writer 10 within a predetermined amount of time, the information processing terminal 30 executes a process related to logging out the user who was logged into the designated system on the basis of that reader/writer 10 entering the communication range N2. Specifically, in the case of the configuration illustrated in FIG. 1, or in other words a configuration in which the server 40 executes the processes of logging a user into and out of the system, the information processing terminal 30 requests the server 40 to execute a process related to logging out the relevant user.

Note that the entry and departure of the reader/writer 10 with respect to the communication range N2 of the information processing terminal 30 may be sensed by at least one of the reader/writer 10 and the information processing terminal 30 recognizing the presence or absence of a response from the other.

As a specific example, it may be configured such that the information processing terminal 30 side stands by for a connection request, and the reader/writer 10 side regularly broadcasts a connection request. According to such a configuration, when the reader/writer 10 enters the communication range N2, the information processing terminal 30 receives a connection request broadcast from the reader/writer 10, and thus is able to sense that the reader/writer 10 has entered the communication range N2.

Also, at least one of the reader/writer 10 and the information processing terminal 30 may successively monitor the presence or absence of a response from the other, and in the case of no response from the other for at least a fixed amount of time, recognize that communication with the other has been interrupted.

According to such a configuration, a user becomes able to carry a reader/writer 10 with his or her own IC card 20 inserted therein, and log out from a designated system by departing the communication range N2 of an information processing terminal 30, without performing complicated operations.

As above, an information processing system 1 according to an embodiment, when triggered by the entry/departure of a reader/writer 10 with respect to the communication range N2 of an information processing terminal 30, causes that information processing terminal 30 to execute a process related to login/logout with respect to a designated system. For this reason, by having a user approach an information processing terminal 30 while carrying a reader/writer 10 with his or her own IC card 20 inserted therein, the user becomes able to input his or her own authentication information into that information processing terminal 30 and log into the designated system, without performing complicated operations. Similarly, by moving away from the information processing terminal 30 while carrying the reader/writer 10, the user becomes able to log out from the designated system that the user was logged into, without performing complicated operations.

Note that the information processing terminal 30, the server 40, and the database 50 may also not be provided in strictly separate configurations, and may also be partially or wholly combined in an integrated configuration. As a specific example, by providing the information processing terminal 30 with functionality corresponding to the server 40 and the database 50, the information processing terminal 30 itself may also be configured to manage/store authentication information and execute processes related to authentication.

2. HARDWARE CONFIGURATION OF READER/WRITER

Next, a hardware configuration of a reader/writer 10 according to an embodiment will be described with reference to FIG. 2. FIG. 2 is a diagram illustrating an example of a hardware configuration of a reader/writer 10 according to an embodiment.

As illustrated in FIG. 2, the reader/writer 10 includes a central processing unit (CPU) 901, read-only memory (ROM) 903, random access memory (RAM) 905, an acquisition device 907, a communication device 909, an operating device 911, and a bus 913.

The acquisition device 907 is a device for acquiring authentication information from the IC card 20.

For example, the acquisition device 907 may include a communication device using a wireless communication technology such as NFC-based communication technology or RFID technology. As a specific example, the acquisition device 907 may be made to operate as an NFC reader/writer, and acquire authentication information from an NFC tag provided in the IC card 20. In this case, in order to realize NFC communication, the acquisition device 907 may also include a high-frequency signal generator that generates a high-frequency signal, a demodulator that demodulates a signal, and an antenna that acts as a communication interface with the IC card 20, for example.

Also, communication between the acquisition device 907 and the IC card 20 is not limited to contactless communication such as NFC and RFID technology. For example, optical communication such as infrared communication may also be used for communication between the acquisition device 907 and the IC card 20. Also, as another example, communication using audio such as tone signals or push signals may also be used for communication between the acquisition device 907 and the IC card 20. As above, the specifications of the communication are not limited insofar as the communication enables information to be transmitted and received between the acquisition device 907 and the IC card 20.

Also, as another example, a one- or multi-dimensional code (for example, a two-dimensional code or three-dimensional code) such as a barcode or QR code (registered trademark) may also be used as a medium for acquiring authentication information. In this case, the one- or multi-dimensional code corresponds to information encoding the authentication information, for example.

In the case of using a one- or multi-dimensional code, the acquisition device 907 captures an image of the code with a built-in or linked image capture unit, for example, thereby acquiring image information of the code as the information related to authentication. Herein, the image capture unit may be realized by an image capture device that includes a lens and an image sensor. With such a configuration, the acquisition device 907 or the CPU 901 may also acquire authentication information by analyzing a captured code, for example. Note that in the case of using a multi-dimensional code, a medium with the code applied thereto (for example, a card) obviously may be used for the configuration illustrated as the IC card 20.

Also, in the case of using a one- or multi-dimensional code, image information of the captured code may be treated as the information related to authentication, for example. In this case, the information processing terminal 30 or the server 40 in FIG. 1 may also acquire authentication information by analyzing the code, for example.

Note that the mode of the acquisition device 907 and the IC card 20 discussed above is merely one example, and that the mode is not particularly limited insofar as authentication information recorded onto a medium corresponding to the IC card 20 according to a designated recording scheme is acquirable on the basis of a retrieval method corresponding to that recording scheme.

The communication device 909 is a communication means provided in the reader/writer 10, and communicates with an external device (for example, the information processing terminal 30) via a network. The communication device 909 is an interface for wireless communication, and may include components such as a communication antenna, a radio frequency (RF) circuit, and a baseband processor.

The communication device 909 includes a function of conducting various signal processing on a signal received from an external device, and is capable of supplying the CPU 901 with a digital signal generated from a received analog signal.

In addition, the communication device 909 includes a function of performing various signal processing on a digital signal for conversion into an analog signal, and is capable of transmitting to an external device an analog signal generated from a digital signal supplied from the CPU 901.

The CPU 901 functions as a computational processing device and control device, and controls overall operation inside the reader/writer 10 by following various programs. The CPU 901 may be made up of circuits for executing various computational processes, for example. Also, the CPU 901 may be a microprocessor. The CPU 901 is capable of realizing various functions by following various programs.

The ROM 903 is capable of storing information such as programs and computational parameters used by the CPU 901. Also, the RAM 905 is capable of temporarily storing information such as programs used during execution by the CPU 901, and parameters that change as appropriate during such execution.

The operating device 911 includes a function of generating an input signal by which a user performs a desired operation. The operating device 911 may include components such as an input unit by which the user inputs information, such as buttons and switches, and an input control circuit that generates an input signal on the basis of input from the user, and supplies the input signal to the CPU 901, for example.

The bus 913 interconnects the CPU 901, the ROM 903, the RAM 905, the acquisition device 907, the communication device 909, and the operating device 911. The bus 913 may also include multiple types of busses.

Note that the hardware configuration indicated above is merely one example, and that an embodiment is not strictly limited to the above hardware configuration. As a specific example, the acquisition device 907 and the communication device 909 may be made up of a single chip. Also, an antenna enabling the communication device 909 to communicate with an external device may be externally attached.

3. FUNCTIONAL CONFIGURATION OF INFORMATION PROCESSING SYSTEM

Next, an example of a functional configuration of an information processing system 1 according to an embodiment will be described with reference to FIG. 3, with particular focus on the configuration of the reader/writer 10 and the information processing terminal 30. FIG. 3 is a block diagram illustrating an example of a functional configuration of an information processing system 1 according to an embodiment.

As illustrated in FIG. 3, the reader/writer 10 includes a communication unit 102, a communication control unit 104, a communication information storage unit 106, an acquisition control unit 108, and an acquisition unit 110. Also, the information processing terminal 30 includes a communication unit 302, a communication control unit 304, a user interface (UI) 306, and an authentication control unit 308.

The communication unit 102 is a configuration enabling the reader/writer 10 to wirelessly communicate with the information processing terminal 30 (that is, an external device). The communication unit 102 may also be configured as a communication device for conducting short-range wireless communication over a communication range from several meters to several dozen meters, such as Bluetooth (registered trademark) or Wi-Fi (registered trademark). Note that hereinafter, in the case in which the respective components inside the reader/writer 10 transmit or receive information to and from the information processing terminal 30, unless specifically stated otherwise, it is assumed that information is transmitted or received via the communication unit 102.

The communication control unit 104 controls the operation of the communication unit 102 according to the state of wireless communication between the reader/writer 10 and the information processing terminal 30 (for example, whether or not communication is possible). In addition, the communication control unit 104 may also control the operation of the communication unit 102 according the operating state of the reader/writer 10 (for example, whether or not the reader/writer 10 is currently operating). Accordingly, hereinafter, the communication control unit 104 will be taken to be that which controls the operation of the communication unit 102 according to such operating states and such wireless communication states, and respective states (operating modes) of the reader/writer 10 as well as the operation of the communication control unit 104 in each state will be described with reference to FIG. 4. FIG. 4 is a state transition diagram illustrating state transitions of the reader/writer 10 according to an embodiment.

In FIG. 4, the power-off state F10 indicates the state of the reader/writer 10 being powered off, or in other words, a state in which the reader/writer 10 is not activated. Stated differently, in the case of using the operating state of the reader/writer 10 for control, the power-off state F10 explicitly indicates a state of the reader/writer 10 being powered off. For this reason, in the case of activating the reader/writer 10, the communication control unit 104 may recognize the power-off state F10 as an initial state, and judge the state of the reader/writer 10 after activation (that is, the state after the transition) with reference to the power-off state F10. For example, in the case of the example illustrated in FIG. 4, when the reader/writer 10 is activated, the state of the reader/writer 10 transitions to a connection request standby state F20 (step S10).

The connection request standby state F20 indicates a state in which the reader/writer 10 has not completed configuration for wirelessly communicating with the information processing terminal 30 (for example, a state in which information for communicating with the information processing terminal 30 has not been registered). In the case of operating in the connection request standby state F20, the communication control unit 104 controls the operation of the communication unit 102 to stand by for a connection request from the information processing terminal 30.

In the case of receiving a connection request from an information processing terminal 30 while in the connection request standby state F20, the communication control unit 104 executes a process for establishing wireless communication with that information processing terminal 30, or in other words, a process related to registering information for wirelessly communicating with that information processing terminal 30. Note that hereinafter, the process related to registering information for wirelessly communicating with the information processing terminal 30 may be simply called the "registration process" in some cases.

For example, in the case of using wireless communication according to the Bluetooth (registered trademark) standard, while in the connection request standby state F20, the communication control unit 104, on the basis of a connection request from an information processing terminal 30, executes a process related to pairing with that information processing terminal 30.

Specifically, the communication control unit 104 requests, as a response to a connection request, the presentation of an authentication key (for example, a personal identification number (PIN)) from the information processing terminal 30 that received the connection request. The communication control unit 104 acquires an authentication key from the information processing terminal 30 in response to the request, and determines whether or not the acquired authentication key matches an authentication key corresponding to the device of the communication control unit 104 itself (that is, an authentication key of the reader/writer 10).

Note that an authentication key of the reader/writer 10 may be stored in advance in the communication information storage unit 106. The communication information storage unit 106 is a storage unit that stores information (for example, an authentication key) enabling the communication control unit 104 to wirelessly communicate with the information processing terminal 30. In this case, by comparing an authentication key acquired from the information processing terminal 30 to an authentication key stored in the communication information storage unit 106, the communication control unit 104 may determine whether or not the acquired authentication key and the authentication key of the reader/writer 10 match.

In the case in which the authentication key acquired from the information processing terminal 30 and the authentication key of the reader/writer 10 match, the communication control unit 104 acquires control information for specifying the information processing terminal 30 (for example, a device address of the information processing terminal 30) from that information processing terminal 30, and stores the control information in the communication information storage unit 106. Consequently, thereafter, the communication control unit 104 becomes able to transmit a wireless communication connection request by directly specifying the information processing terminal 30 on the basis of the control information stored in the communication information storage unit 106, and establish communication. Note that at this point, the communication control unit 104 may also report control information for specifying the reader/writer 10 (for example, a device address of the reader/writer 10) to the information processing terminal 30.

Note that the example of a process for establishing wireless communication indicated above is merely one example, and that obviously the content of the process and the classes of information transmitted and received may be appropriately modified according to the wireless communication scheme between the communication control unit 104 and the information processing terminal 30. Additionally, although the comparison of authentication keys is conducted only on the reader/writer 10 side in the example indicated above, it may also be configured such that a comparison of authentication keys is similarly conducted on the information processing terminal 30 side.

Note that the communication control unit 104 may also judge that the reader/writer 10 is in the connection request standby state F20, on the basis of whether or not information for communicating with the information processing terminal 30 has been registered, for example. In other words, the communication control unit 104 may recognize that the reader/writer 10 is in the connection request standby state F20 in the case in which information for communicating with the information processing terminal 30 has not been registered, and in the case in which such information is registered, the communication control unit 104 may recognize that the reader/writer 10 is in another state (specifically, either the service available state F30 or the reconnection request state F40 discussed later).

Also, as another example, it may be configured such that the state of the reader/writer 10 is managed with a flag. In this case, the configuration for managing state transitions of the reader/writer 10 sets a flag indicating a state to match a transition to that state, and the communication control unit 104 may recognize the state of the reader/writer 10 by referencing that flag. Note that the configuration for managing state transitions of the reader/writer 10 may be the communication control unit 104, or be provided separately from the communication control unit 104, for example.

After the registration process completes and the reader/writer 10 and the information processing terminal 30 enter a communicable state, the communication control unit 104 establishes wireless communication between the reader/writer 10 and the information processing terminal 30. Note that the reader/writer 10 and the information processing terminal 30 being in a communicable state may be, for example, a state in which the reader/writer 10 enters the communication range N2 of the information processing terminal 30, thereby enabling the reader/writer 10 and the information processing terminal 30 to wirelessly communicate with each other.

After wireless communication is established between the reader/writer 10 and the information processing terminal 30, the state of the reader/writer 10 transitions to the service available state F30 (step S20). The service available state F30 indicates a state in which information may be transmitted and received via a wireless communication link established between the reader/writer 10 and the information processing terminal 30.

After transitioning to the service available state F30, the communication control unit 104 receives a request to transmit authentication information from the information processing terminal 30. Upon receiving the transmission request, the communication control unit 104 instructs the acquisition control unit 108 to acquire authentication information, and acquires authentication information from the acquisition control unit 108 in response.

As a response to the transmission request, the communication control unit 104 reports the authentication information acquired from the acquisition control unit 108 to the requesting information processing terminal 30. Upon receiving the report, the information processing terminal 30 becomes able to execute a process related to authentication for a designated system, using the reported authentication information as input information.

In addition, while in the service available state F30, the communication control unit 104 successively monitors whether or not the wireless communication between the reader/writer 10 and the information processing terminal 30 is still in an active state (alive monitoring), and thereby senses if the wireless communication is interrupted. As an example of a specific technique, the communication control unit 104 may transmit a specific signal or packet to the information processing terminal 30 via wireless communication at predetermined times, and on the basis of the presence or absence of a response, judge whether the wireless communication with the information processing terminal 30 is in an available state.

While in the service available state F30, if the wireless communication between the reader/writer 10 and the information processing terminal 30 is interrupted, the state of the reader/writer 10 transitions to the reconnection request state F40 (step 530). Note that the reader/writer 10 and the information processing terminal 30 being in a state of interrupted wireless communication may be, for example, a state in which the reader/writer 10 departs the communication range N2 of the information processing terminal 30, thereby making the reader/writer 10 and the information processing terminal 30 unable to wirelessly communicate with each other.

Note that, on the basis of a result of this alive monitoring, the communication control unit 104 may recognize whether the state of the reader/writer 10 is the service available state F30 or the reconnection request state F40 discussed later. Specifically, the communication control unit 104 may recognize that the state of the reader/writer 10 is the service available state F30 in the case of a response from the information processing terminal 30, and recognize that the state of the reader/writer 10 is the reconnection request state F40 in the case of no response from the information processing terminal 30.

In addition, as discussed earlier, the communication control unit 104 may also recognize the state of the reader/writer 10 with a flag. In this case, when wireless communication between the reader/writer 10 and the information processing terminal 30 has been established, the configuration for managing state transitions of the reader/writer 10 may set a flag indicating the service available state F30. Similarly, the configuration for managing state transitions of the reader/writer 10 may set a flag indicating the reconnection request state F40 in the case of recognizing that there is no response from the information processing terminal 30 and that wireless communication has been interrupted.

After transitioning to the reconnection request state F40, the communication control unit 104 controls the operation of the communication unit 102 to transmit a reconnection request for reestablishing wireless communication with respect to the information processing terminal 30. At this point, in the case in which there is no response to the transmitted connection request, the communication control unit 104 may control the operation of the communication unit 102 to retransmit the connection request at a predetermined interval (step S40).

While in the reconnection request state F40, if the reader/writer 10 and the information processing terminal 30 enter a communicable state, the reader/writer 10 receives a response to the connection request from the information processing terminal 30. Note that the reader/writer 10 and the information processing terminal 30 being in a communicable state may be, for example, a state in which the reader/writer 10 reenters the communication range N2 of the information processing terminal 30.

After receiving a response to the connection request from the information processing terminal 30, the communication control unit 104 reestablishes wireless communication between the reader/writer 10 and the information processing terminal 30.

After wireless communication is established between the reader/writer 10 and the information processing terminal 30, the state of the reader/writer 10 transitions to the service available state F30 (step S50).

As described above, if the reader/writer 10 enters the communication range N2 of the information processing terminal 30, wireless communication is established between the reader/writer 10 and the information processing terminal 30, and if the reader/writer 10 departs the communication range N2, the wireless communication is interrupted. In this way, the state of the reader/writer 10 transitions between the service available state F30 and the reconnection request state F40 according to the establishment and interruption of wireless communication between the reader/writer 10 and the information processing terminal 30. At this point, the communication control unit 104 controls the operation of the communication unit 102 according to the state of the reader/writer 10, thereby enabling reconnection to the information processing terminal 30 in the case of entering a state in which wireless communication with the information processing terminal 30 is available, even if wireless communication had been interrupted.

Note that the reader/writer 10 may also be configured to receive an instruction from a user via an operating unit not illustrated (the operating device in FIG. 2), and be able to transition the state of the reader/writer 10 itself to the power-off state F10 or the connection request standby state F20. In this case, when transitioning to such state, obviously the communication control unit 104 may be made to switch its own processing to match the state after the transition.

The acquisition unit 110 is a configuration for acquiring authentication information recorded on the IC card 20. For example, the acquisition unit 110 may include a communication device using a wireless communication technology such as NFC-based communication technology or RFID technology. In this case, the acquisition unit 110 establishes NFC communication with an NFC tag provided in the IC card 20, and acquires authentication information from the NFC tag.

The operation of the acquisition unit 110 is controlled by the acquisition control unit 108. The acquisition control unit 108 receives an instruction related to authentication information acquisition from the communication control unit 104. Upon receiving this instruction, the acquisition control unit 108 causes the acquisition unit 110 to establish communication with the IC card 20 and acquire authentication information from the IC card 20. The acquisition control unit 108 then causes the acquisition unit 110 to output the acquired authentication information, and reports the output authentication information to the communication control unit 104.

In this way, the acquisition unit 110 communicates with the IC card 20 only in the case in which the communication control unit 104 instructs the acquisition control unit 108 to acquire authentication information (that is, in the case of receiving a request to transmit authentication information from the information processing terminal 30). For this reason, a device with extremely low power consumption (or no power consumption) during periods of inactivity such as a communication device utilizing NFC communication may be applied as the acquisition unit 110, thereby making it possible to minimize the power consumption related to acquiring electric power from the IC card 20.

The communication unit 302 is a configuration enabling the information processing terminal 30 to wirelessly communicate with the reader/writer 10. Note that obviously the communication unit 302 is configured as a communication device capable of communicating according to a similar scheme as the communication unit 102.

The communication control unit 304 controls the operation of the communication unit 302. Hereinafter, the specific content of the processes by the communication control unit 304 will be described.

The communication control unit 304, when instructed by a user via the UI 306 to conduct a process for establishing wireless communication with the reader/writer 10, controls the operation of the communication unit 302 to broadcast a connection request to an external device (that is, the reader/writer 10) positioned in the communication range N2. The UI 306 is a user interface related to inputting and outputting information between the information processing terminal 30 and a user.

In the case in which a reader/writer 10 standing by for a connection request exists in the communication range N2, the communication control unit 304 receives a request related to presenting an authentication key from that reader/writer 10 as a response to the connection request.

After receiving the request related to presenting an authentication key, the communication control unit 304 presents an input screen for inputting the authentication key of the requesting reader/writer 10 to the user via the UI 306, and acquires key information input by the user from the UI 306, for example. The communication control unit 304 reports the key information acquired from the user via the UI 306 to the requesting reader/writer 10.

Note that in the case of receiving a request related to presenting an authentication key, the communication control unit 304 may also cause operations that report key information stored in advance in a storage area readable by the communication control unit 304 itself to the requesting the reader/writer 10, without user input.

If the key information reported to the reader/writer 10 is confirmed to be correct on the reader/writer 10 side, the communication control unit 304 reports control information for specifying the information processing terminal 30 (for example, a device address of the information processing terminal 30) to the reader/writer 10. Consequently, thereafter, the reader/writer 10 becomes able to establish wireless communication by directly specifying the information processing terminal 30 on the basis of the reported control information.

Also, at this point, the communication control unit 304 may acquire control information for specifying the reader/writer 10 (for example, a device address of the reader/writer 10) from the reader/writer 10. Consequently, thereafter, the communication control unit 304 becomes able to transmit a wireless communication connection request by directly specifying the reader/writer 10 on the basis of the acquired control information, and establish communication.

If wireless communication is established between the information processing terminal 30 and the reader/writer 10, the communication control unit 304 reports the establishment of the wireless communication to the authentication control unit 308 discussed later. Consequently, the authentication control unit 308 becomes able to request the reader/writer 10 to report authentication information via the established wireless communication.

Also, if wireless communication is established between the information processing terminal 30 and the reader/writer 10, the communication control unit 304 successively monitors whether or not the wireless communication is still in an active state (alive monitoring), and thereby senses if the wireless communication is interrupted. As an example of a specific technique, the communication control unit 304 may transmit a specific signal or packet to the reader/writer 10 via wireless communication at a predetermined time interval, and on the basis of the presence or absence of a response, judge whether the wireless communication with the reader/writer 10 is in an active state.

If wireless communication between the information processing terminal 30 and the reader/writer 10 is interrupted, the communication control unit 304 stands by for a connection request from the reader/writer 10 (that is, a connection request for reestablishing wireless communication). Also, in the case in which the state of interrupted wireless communication continues for at least a designated amount of time (that is, in the case of a timeout), the communication control unit 304 reports to the authentication control unit 308 discussed later that wireless communication has been interrupted for at least the designated amount of time. Also, in the case in which the state of interrupted wireless communication exceeds a designated amount of time, the communication control unit 304 may report to the authentication control unit 308 that wireless communication has been interrupted past the designated amount of time. Note that hereinafter, the communication control unit 304 is described as reporting to the authentication control unit 308 in the case in which the state of wireless communication continues for at least a designated amount of time.

In the case of receiving a connection request from the reader/writer 10 after wireless communication between the information processing terminal 30 and the reader/writer 10 is interrupted, the communication control unit 304 checks whether or not the reader/writer 10 originating the connection request is a registered (for example, a paired) communication peer. As a specific example, the communication control unit 304 may cause the reader/writer 10 originating the connection request to report control information for specifying that reader/writer 10 (for example, a device address of the reader/writer 10), and judge whether or not that reader/writer 10 is registered according to whether or not the reported control information matches control information acquired during registration. Also, as another example, the communication control unit 304 may generate communication link information (for example, a connection number) after registering wireless communication (for example, after pairing), and in the case of receiving a connection request, cause the reader/writer 10 originating the connection request to report that communication link information. In this case, the communication control unit 304 may judge whether or not that reader/writer 10 is registered according to whether or not the communication link information reported from the reader/writer 10 originating the connection request matches corresponding information stored when the communication control unit 304 itself generated that information.

In the case in which the reader/writer 10 originating the connection request is a registered communication peer, the communication control unit 304 reestablishes wireless communication between the information processing terminal 30 and the reader/writer 10. Additionally, the communication control unit 304 reports the reestablishment of wireless communication to the authentication control unit 308 discussed later.

The authentication control unit 308 executes a process related to authentication for a designated system or a process related to login/logout, according to a state of wireless communication between the information processing terminal 30 and the reader/writer 10 reported from the communication control unit 304. Hereinafter, the specific content of the processes by the authentication control unit 308 will be described.

In the case in which the communication control unit 304 reports the establishment of wireless communication between the information processing terminal 30 and the reader/writer 10 (that is, in the case in which communication with the reader/writer 10 is first established), the authentication control unit 308 requests the reader/writer 10 to report authentication information via the established wireless communication. Subsequently, the authentication control unit 308 acquires authentication information from the reader/writer 10 in response to the request.

The authentication control unit 308 transmits the authentication information acquired from the reader/writer 10 to the server 40, and requests the server 40 to register the authentication information. Receiving this request, the server 40 registers the authentication information acquired from the authentication control unit 308 in the database 50. Note that in the case in which the authentication information acquired from the reader/writer 10 is already registered, the authentication control unit 308 or the server 40 may omit processes related to registering that authentication information.

When registration of the authentication information is completed, the authentication control unit 308 may also request the server 40 to conduct a process related to logging the user indicated by the authentication information into a designated system. On the basis of this request, the server 40 executes a process related to logging that user into the designated system. In other words, the user enters a state of being logged into the designated system.

Also, while the user indicated by the authentication information is in a logged-in state, in the case of receiving a report from the communication control unit 304 that wireless communication has been interrupted for at least a designated amount of time, the authentication control unit 308 requests the server 40 to conduct a process related to logging out that user. On the basis of this request, the server 40 executes a process related to logging out that user from the designated system. In other words, the user enters a state of being logged out from the designated system.

Also, in the case in which the communication control unit 304 reports the reestablishment of wireless communication between the information processing terminal 30 and the reader/writer 10, the authentication control unit 308 requests the reader/writer 10 to report authentication information via the reestablished wireless communication. Subsequently, the authentication control unit 308 acquires authentication information from the reader/writer 10 in response to the request.

The authentication control unit 308 determines whether or not the user indicated by the acquired authentication information is a registered user. In the case in which the user indicated by the authentication information is not a registered user, the authentication control unit 308 may deny the connection request from the reader/writer 10. Also, as another example, in the case in which the user indicated by the authentication information is not a registered user, the authentication control unit 308 may be configured to execute a process related to registering that user.

In the case in which the user indicated by the authentication information is a registered user, the authentication control unit 308 determines whether or not that user is in a state of being logged into the designated system.

Note that the authentication control unit 308 may also check whether or not the user indicated by the acquired authentication information is a registered user, and also check the login state of that user with respect to the designated system, by querying the server 40.

In the case in which the user indicated by the authentication information is logged out from the designated system, the authentication control unit 308 may transmit the acquired authentication information to the server 40, and request the server 40 to conduct a process related to logging the user indicated by that authentication information into the designated system. Note that in the case in which the user indicated by the authentication information is already logged into the designated system, the authentication control unit 308 obviously may not request the server 40 to conduct such a process related to logging in.

The foregoing thus describes a functional configuration of an information processing system 1, with particular focus on the reader/writer 10 and the information processing terminal 30. For example, the communication unit 102 and the acquisition unit 110 may be realized respectively by the communication device 909 and the acquisition device 907 illustrated in FIG. 2. Also, the communication information storage unit 106 may be realized by the ROM 903 or the RAM 905 illustrated in FIG. 2. Also, the communication control unit 104 and the acquisition control unit 108 may be realized by the CPU 901 illustrated in FIG. 2. In other words, a program causing a computer to function as the communication control unit 104 and the acquisition control unit 108 may be held in the ROM 903 or the RAM 905, and the CPU 901 may execute that program.

Note that although the example indicated above describes an example in which the communication unit 102, the acquisition unit 110, and the communication information storage unit 106 (that is, the communication device 909, the acquisition device 907, and the ROM 903 or RAM 905 of FIG. 2) are built into the reader/writer 10, an embodiment is not strictly limited to this configuration. For example, at least one of the communication unit 102, the acquisition unit 110, and the communication information storage unit 106 may be configured externally, without being built into the reader/writer 10.

4. PROCESS FLOWS

Next, schematic process flows of an information processing system 1 according to an embodiment will be described with reference to FIG. 4 and FIGS. 5 to 10.

First, a flow of operations of the information processing system 1 will be described with reference to FIGS. 5 and 6, for the case in which the state of the reader/writer 10 transitions from the connection request standby state F20 to the service available state F30 in FIG. 4. FIG. 5 is a flowchart illustrating a schematic process flow in an information processing system 1 according to an embodiment. Also, FIG. 6 is a sequence diagram illustrating a detailed flow of operations in an information processing system according to an embodiment. First, FIG. 5 will be referenced.

(Step S21)

When the reader/writer 10 is activated, the state of that reader/writer 10 transitions to the connection request standby state F20. In the case of operating in the connection request standby state F20, the reader/writer 10 stands by for a connection request from the information processing terminal 30.

In the case of receiving a connection request from an information processing terminal 30 while in the connection request standby state F20, the reader/writer 10 executes a process for establishing wireless communication with that information processing terminal 30, or in other words, a registration process for wirelessly communicating with that information processing terminal 30.

(Step S23)

When the registration process for wireless communication between the information processing terminal 30 and the reader/writer 10 completes and the wireless communication is established, the information processing terminal 30 requests the reader/writer 10 to report authentication information. Upon receiving this request, the reader/writer 10 acquires authentication information recorded on the IC card 20, and reports the acquired authentication information to the information processing terminal 30. The information processing terminal 30, on the basis of the authentication information reported from the reader/writer 10, executes a process related to logging the user indicated by that authentication information into a designated system.

At this point, an example of a detailed processing sequence by the information processing system 1 in the series of processes according to steps S21 to S23 discussed above will be described with reference to FIG. 6.

(Step S212)

First, when the reader/writer 10 is activated, the state of the reader/writer 10 transitions to the connection request standby state F20. In the case of operating in the connection request standby state F20, the communication control unit 104 of the reader/writer 10 controls the operation of the communication unit 102 to stand by for a connection request from the information processing terminal 30.

Also, the communication control unit 304, when instructed by a user via the UI 306 to conduct a process for establishing wireless communication with the reader/writer 10, controls the operation of the communication unit 302 to broadcast a connection request to an external device (that is, the reader/writer 10) positioned in the communication range N2.

(Step S214)

In the case of receiving a connection request from an information processing terminal 30 while in the connection request standby state F20, the communication control unit 104 executes a process for establishing wireless communication with that information processing terminal 30 (that is, a registration process). Hereinafter, as a specific example, the case of using wireless communication according to the Bluetooth (registered trademark) standard will be described.

The communication control unit 104 requests, as a response to a connection request, the presentation of an authentication key (for example, a PIN) from the information processing terminal 30 that received the connection request.

(Step S216)

After receiving the request related to presenting an authentication key, the communication control unit 304 of the information processing terminal 30 presents an input screen for inputting the authentication key of the requesting reader/writer 10 to the user via the UI 306, and acquires key information input by the user from the UI 306, for example.

(Step S218)

The communication control unit 304 reports the key information acquired from the user via the UI 306 to the requesting reader/writer 10.

(Step S220)

The communication control unit 104 acquires an authentication key from the information processing terminal 30 in response to the request, and determines whether or not the acquired authentication key matches an authentication key corresponding to the device of the communication control unit 104 itself (that is, an authentication key of the reader/writer 10).

If the key information reported to the reader/writer 10 is confirmed to be correct on the reader/writer 10 side, the communication control unit 304 reports control information for specifying the information processing terminal 30 (for example, a device address of the information processing terminal 30) to the reader/writer 10. The communication control unit 104 acquires the control information from the information processing terminal 30, and causes the communication information storage unit 106 to store the control information. Consequently, thereafter, the communication control unit 104 becomes able to transmit a wireless communication connection request by directly specifying the information processing terminal 30 on the basis of the control information stored in the communication information storage unit 106, and establish communication. Note that at this point, the communication control unit 104 may also report control information for specifying the reader/writer 10 (for example, a device address of the reader/writer 10) to the information processing terminal 30.

(Step S232)

If the registration process for wireless communication between the information processing terminal 30 and the reader/writer 10 completes and the wireless communication is established, the communication control unit 304 reports the establishment of the wireless communication to the authentication control unit 308 discussed later.

In the case in which the communication control unit 304 reports the establishment of wireless communication between the information processing terminal 30 and the reader/writer 10, the authentication control unit 308 requests the reader/writer 10 to report authentication information via the established wireless communication.

(Step S234)

After a wireless communication link is established between the reader/writer 10 and the information processing terminal 30, the state of the reader/writer 10 transitions to the service available state F30. After transitioning to the service available state F30, the communication control unit 104 receives a request to transmit authentication information from the information processing terminal 30. Upon receiving the transmission request, the communication control unit 104 instructs the acquisition control unit 108 to acquire authentication information.

Upon receiving the instruction related to acquiring authentication information from the communication control unit 104, the acquisition control unit 108 causes the acquisition unit 110 to establish communication with the IC card 20 and acquire authentication information from the IC card 20.

(Step S236)

The acquisition unit 110 is a configuration for acquiring authentication information recorded on the IC card 20. Also, on the IC card 20, authentication information for logging into the designated system is recorded in advance.

For example, the acquisition unit 110 may include a communication device using a wireless communication technology such as NFC-based communication technology or RFID technology. In this case, the acquisition unit 110 establishes NFC communication with an NFC tag provided in the IC card 20.

The NFC tag provided in the IC card 20 reports authentication information stored in advance to the acquisition unit 110 via the established NFC communication. On the basis of this report, the acquisition unit 110 acquires the authentication information recorded on the IC card 20, and outputs the acquired authentication information to the acquisition control unit 108. The acquisition control unit 108 reports the authentication information output from the acquisition unit 110 to the communication control unit 104.

(Step S238)

As a response to the transmission request for authentication information from the information processing terminal 30, the communication control unit 104 reports the authentication information acquired from the acquisition control unit 108 to that information processing terminal 30.

(Step S240)

The authentication control unit 308 transmits the authentication information acquired from the reader/writer 10 to the server 40, and requests the server 40 to register the authentication information. Receiving this request, the server 40 registers the authentication information acquired from the authentication control unit 308 in the database 50. Note that in the case in which the authentication information acquired from the reader/writer 10 is already registered, the authentication control unit 308 or the server 40 may omit processes related to registering the authentication information.

(Step S242)

When registration of the authentication information is completed, the authentication control unit 308 may also request the server 40 to conduct a process related to logging in the user indicated by the authentication information into a designated system. On the basis of this request, the server 40 executes a process related to logging in that user into the designated system. In other words, the user enters a state of being logged into the designated system.

Next, a flow of operations of the information processing system 1 will be described with reference to FIGS. 7 and 8, for the case in which the state of the reader/writer 10 transitions from the service available state F30 to the reconnection request state F40 in FIG. 4. FIG. 7 is a flowchart illustrating a schematic process flow in an information processing system 1 according to an embodiment. Also, FIG. 8 is a sequence diagram illustrating a detailed flow of operations in an information processing system according to an embodiment. First, FIG. 7 will be referenced.

(Step S31)

If wireless communication is established between the information processing terminal 30 and the reader/writer 10, the communication control unit 304 of the information processing terminal 30 successively monitors whether or not the wireless communication is still in an active state (alive monitoring), and thereby senses if the wireless communication is interrupted.

Similarly, while in the service available state F30, the communication control unit 104 of the reader/writer 10 successively monitors whether or not the wireless communication between the reader/writer 10 and the information processing terminal 30 is still in an active state (alive monitoring), and thereby senses if the wireless communication is interrupted.

(Step S33)

In the case in which wireless communication between the information processing terminal 30 and the reader/writer 10 is interrupted, the information processing terminal 30 stands by for a connection request from the reader/writer 10. In addition, the reader/writer 10 transmits a connection request for reestablishing wireless communication to the information processing terminal 30. At this point, in the case in which there is no response to the transmitted connection request, the reader/writer 10 may also transmit the connection request at a predetermined interval.

In the case of receiving a connection request from the reader/writer 10 after wireless communication between the information processing terminal 30 and the reader/writer 10 is interrupted (step S33, YES), the information processing terminal 30 reestablishes wireless communication between the information processing terminal 30 and the reader/writer 10. At this point, the information processing terminal 30 being in a state capable of receiving a connection request from the reader/writer 10 (that is, a state capable of reconnection) may be, for example, a state in which the reader/writer 10 enters the communication range N2 of the information processing terminal 30, thereby enabling the reader/writer 10 and the information processing terminal 30 to wirelessly communicate with each other. Note that operations in the case of reestablishing wireless communication between the information processing terminal 30 and the reader/writer 10 will be separately discussed later.

(Steps S33, S35, S37)

In the case in which wireless communication with the reader/writer 10 is interrupted, as long as the information processing terminal 30 does not receive a connection request from the reader/writer 10 (step S33, NO), the information processing terminal 30 stands by to receive a connection request from the reader/writer 10 for a designated amount of time (step S37, NO).

(Step S39)

In the case in which the state of interrupted wireless communication with the reader/writer 10 continues for at least a designated amount of time (that is, in the case of a timeout) (step S37, YES), the information processing terminal 30 executes a process related to logging out the user who is logged into the designated system.

At this point, an example of a detailed processing sequence by the information processing system 1 in the series of processes according to steps S31 to S39 discussed above will be described with reference to FIG. 8. First, operations of the information processing terminal 30 will be described in detail as steps S312 to S316.

(Step S312)

When wireless communication is established between the information processing terminal 30 and the reader/writer 10, the communication control unit 304 successively monitors whether or not the wireless communication is still in an active state (alive monitoring), and thereby senses if the wireless communication is interrupted. As an example of a specific technique, the communication control unit 304 may transmit a specific signal or packet to the information processing terminal 30 via wireless communication at a predetermined interval, and on the basis of the presence or absence of a response, judge whether the wireless communication with the reader/writer 10 is in an available state.

Note that the information processing terminal 30 and the reader/writer 10 being in a state of interrupted wireless communication may be, for example, a state in which the reader/writer 10 departs the communication range N2 of the information processing terminal 30, thereby making the reader/writer 10 and the information processing terminal 30 unable to wirelessly communicate with each other.

(Step S314)

If wireless communication between the information processing terminal 30 and the reader/writer 10 is interrupted, the communication control unit 304 stands by for a connection request from the reader/writer 10.

(Step S316)

In the case in which the state of interrupted wireless communication continues for at least a designated amount of time (that is, in the case of a timeout), the communication control unit 304 reports to the authentication control unit 308 that wireless communication has been interrupted for at least the designated amount of time.

While the user indicated by the authentication information is in a logged-in state, in the case of receiving a report from the communication control unit 304 that wireless communication has been interrupted for at least a designated amount of time, the authentication control unit 308 requests the server 40 to conduct a process related to logging out that user. On the basis of this request, the server 40 executes a process related to logging out that user from the designated system. In other words, the user enters a state of being logged out from the designated system.

Next, operations of the reader/writer 10 will be described in detail as steps S412 to S418.

(Step S412)

While in the service available state F30, the communication control unit 104 successively monitors whether or not the wireless communication between the reader/writer 10 and the information processing terminal 30 is still in an active state (alive monitoring), and thereby senses if the wireless communication is interrupted. While in the service available state F30, if the wireless communication between the reader/writer 10 and the information processing terminal 30 is interrupted, the state of the reader/writer 10 transitions to the reconnection request state F40.

(Step S414)

After transitioning to the reconnection request state F40, the communication control unit 104 controls the operation of the communication unit 102 to transmit a reconnection request to the information processing terminal 30.

(Steps S414, S416, S418)

In the case in which there is no response to the transmitted connection request (that is, the connection request for reestablishing wireless communication), the communication control unit 104 may control the operation of the communication unit 102 to retransmit the connection request at a predetermined interval.

Next, a flow of operations of the information processing system 1 will be described with reference to FIGS. 9 and 10, for the case in which the state of the reader/writer 10 transitions from the service available state F30 to the reconnection request state F40 in FIG. 4. FIG. 9 is a flowchart illustrating a schematic process flow in an information processing system 1 according to an embodiment. Also, FIG. 10 is a sequence diagram illustrating a detailed flow of operations in an information processing system according to an embodiment. First, FIG. 9 will be referenced.

(Step S51)

In the case of receiving a connection request from the reader/writer 10 after wireless communication between the information processing terminal 30 and the reader/writer 10 is interrupted (that is, a connection request for reestablishing wireless communication), the information processing terminal 30 reestablishes wireless communication between the information processing terminal 30 and the reader/writer 10.

(Step S53)

When wireless communication between the information processing terminal 30 and the reader/writer 10 is reestablished, the information processing terminal 30 requests the reader/writer 10 to report authentication information via the reestablished wireless communication. Upon receiving this request, the reader/writer 10 acquires authentication information recorded on the IC card 20, and reports the acquired authentication information to the information processing terminal 30.

(Step S55)

The information processing terminal 30 determines whether or not the user indicated by the authentication information acquired from the reader/writer 10 is a registered user.

In the case in which the user indicated by the authentication information is not a registered user (step S55, NO), the information processing terminal 30 may deny the connection request from the reader/writer 10. Also, as another example, in the case in which the user indicated by the authentication information is not a registered user, the information processing terminal 30 may be configured to execute a process related to registering that user.

(Step S57)

In the case in which the user indicated by the authentication information is a registered user (step S55, YES), the information processing terminal 30 determines whether or not that user is in a state of being logged into the designated system.

In the case in which the user indicated by the authentication information is logged out from the designated system, the information processing terminal 30 may transmit the acquired authentication information to the server 40, and request the server 40 to conduct a process related to logging the user indicated by that authentication information into the designated system. Note that in the case in which the user indicated by the authentication information is already logged into the designated system, the information processing terminal 30 obviously may not request the server 40 to conduct such a process related to logging in. As a result of the above, the user indicated by the authentication information enters a state of being logged into the designated system.

At this point, an example of a detailed processing sequence by the information processing system 1 in the series of processes according to steps S51 to S57 discussed above will be described with reference to FIG. 10.

(Step S414)

As discussed above, if wireless communication between the information processing terminal 30 and the reader/writer 10 is interrupted, the communication control unit 304 stands by for a connection request from the reader/writer 10.

Also, if wireless communication between the reader/writer 10 and the information processing terminal 30 is interrupted and the reader/writer 10 transitions to the reconnection request state F40, the communication control unit 104 controls the operation of the communication unit 102 to transmit a connection request to the information processing terminal 30.

(Steps S512, S514)

In the case of receiving a connection request from the reader/writer 10 after wireless communication between the information processing terminal 30 and the reader/writer 10 is interrupted, the communication control unit 304 checks whether or not the reader/writer 10 originating the connection request is a registered (for example, a paired) communication peer. As a specific example, the communication control unit 304 may cause the reader/writer 10 originating the connection request to report control information for specifying that reader/writer 10 (for example, a device address of the reader/writer 10), and judge whether or not that reader/writer 10 is registered according to whether or not the reported control information matches control information acquired during registration. Also, as another example, the communication control unit 304 may generate communication link information (for example, a connection number) after registering wireless communication (for example, after pairing), and in the case of receiving a connection request, cause the reader/writer 10 originating the connection request to report that communication link information. In this case, the communication control unit 304 may judge whether or not that reader/writer 10 is registered according to whether or not the communication link information reported from the reader/writer 10 originating the connection request matches corresponding information stored when the communication control unit 304 itself generated that information.

In the case in which the reader/writer 10 originating the connection request is a registered communication peer, the communication control unit 304 reestablishes wireless communication between the information processing terminal 30 and the reader/writer 10. Additionally, the communication control unit 304 reports the reestablishment of wireless communication to the authentication control unit 308 discussed later.

(Step S532)

In the case in which the communication control unit 304 reports the reestablishment of wireless communication between the information processing terminal 30 and the reader/writer 10, the authentication control unit 308 requests the reader/writer 10 to report authentication information via the reestablished wireless communication.

(Step S534)

After wireless communication is reestablished between the reader/writer 10 and the information processing terminal 30, the state of the reader/writer 10 transitions back to the service available state F30. After transitioning to the service available state F30, the communication control unit 104 receives a request to transmit authentication information from the information processing terminal 30. Upon receiving the transmission request, the communication control unit 104 instructs the acquisition control unit 108 to acquire authentication information.

Upon receiving the instruction related to acquiring authentication information from the communication control unit 104, the acquisition control unit 108 causes the acquisition unit 110 to establish communication with the IC card 20 and acquire authentication information from the IC card 20.

Thereafter, the processing in steps S536 to S538 is similar to steps S236 to S238 discussed above. In other words, the acquisition unit 110 establishes NFC communication with an NFC tag provided in the IC card 20, and acquires authentication information from the NFC tag via the established NFC communication. The acquisition control unit 108 causes the acquisition unit 110 to output the acquired authentication information, and reports the authentication information to the communication control unit 104. Subsequently, as a response to the transmission request for authentication information from the information processing terminal 30, the communication control unit 104 reports the authentication information acquired from the acquisition control unit 108 to that information processing terminal 30.

(Step S540)

When authentication information is acquired from the reader/writer 10, the authentication control unit 308 determines whether or not the user indicated by that authentication information is a registered user. In the case in which the user indicated by the authentication information is not a registered user, the authentication control unit 308 may deny the connection request from the reader/writer 10. Also, as another example, in the case in which the user indicated by the authentication information is not a registered user, the authentication control unit 308 may be configured to execute a process related to registering that user.

In the case in which the user indicated by the authentication information is a registered user, the authentication control unit 308 determines whether or not that user is in a state of being logged into the designated system.

Note that the authentication control unit 308 may also check whether or not the user indicated by the acquired authentication information is a registered user, and also check the login state of that user with respect to the designated system, by querying the server 40.

In the case in which the user indicated by the authentication information is logged out from the designated system, the authentication control unit 308 may transmit the acquired authentication information to the server 40, and request the server 40 to conduct a process related to logging the user indicated by that authentication information into the designated system. Note that in the case in which the user indicated by the authentication information is already logged into the designated system, the authentication control unit 308 obviously may not request the server 40 to conduct such a process related to logging in. As a result of the above, the user indicated by the authentication information enters a state of being logged into the designated system.

5. CONCLUSION

As described above, an information processing system 1 according to an embodiment, when triggered by the entry/departure of a reader/writer 10 with respect to the communication range N2 of an information processing terminal 30, causes that information processing terminal 30 to execute a process related to login/logout with respect to a designated system. For this reason, by having a user approach an information processing terminal 30 while carrying a reader/writer 10 with his or her own IC card 20 inserted therein, the user becomes able to input his or her own authentication information into that information processing terminal 30 and log into the designated system, without performing complicated operations. Similarly, by moving away from the information processing terminal 30 while carrying the reader/writer 10, the user becomes able to log out from the designated system that the user was logged into, without performing complicated operations.

Also, an information processing system 1 according to an embodiment is configured such that, in the case of executing a process related to registering information for conducting wireless communication with the information processing terminal 30 (that is, a registration process), a connection request is transmitted from the information processing terminal 30, and an authentication key is requested from the reader/writer 10 in response. This is because when inputting an authentication key, in most cases a more diverse and user-friendly UI is available on the information processing terminal 30 than the reader/writer 10. In other words, by using such a configuration, a user becomes able to perform operations related to inputting an authentication key via a user-friendly UI.

Meanwhile, in the case of reestablishing interrupted wireless communication between the information processing terminal 30 and the reader/writer 10, an information processing system 1 according to an embodiment is configured such that the information processing terminal 30 stands by for a connection request, and the reader/writer 10 periodically transmits a connection request. This is because the power consumption on the reader/writer 10 side is very low with respect to the information processing terminal 30. In other words, by using a configuration in which the reader/writer 10 side periodically transmits a connection request as discussed above, it becomes possible to minimize the total power consumption of the information processing system 1 while wireless communication is interrupted.

Also, a reader/writer 10 according to an embodiment accesses the IC card 20 and acquires authentication information only in the case of receiving an authentication information transmission request from the information processing terminal 30. As a specific example, in a configuration that utilizes NFC communication to transmit and receive information between the reader/writer 10 and the IC card 20, the reader/writer 10 transmits a wireless signal to the IC card 20 only in the case of receiving an authentication information transmission request from the information processing terminal 30. For this reason, minimizing the power consumption of the reader/writer 10 becomes possible.

Also, in an information processing system 1 according to an embodiment, a process related to registering information for conducting wireless communication between the reader/writer 10 and the information processing terminal 30 (for example, pairing) is conducted between the reader/writer 10 and the information processing terminal 30, and does not depend on the inserted IC card 20. In other words, according to an information processing system 1 according to an embodiment, even if the IC card 20 is switched for another, it is not necessary to conduct the wireless communication registration process again, and the burden on users of the information processing system 1 (for example, a user or administrator) may be reduced. In addition, by inserting or removing an IC card 20 inserted into the IC card 20, a user becomes able to flexibly switch the authentication information to use for authentication.

Also, in an information processing system 1 according to an embodiment, it is possible to use an existing IC card as the IC card 20. In other words, it is possible to utilize an existing system to realize an information processing system 1 according to an embodiment. Specifically, if the reader/writer 10 is introduced to an existing system, and a configuration for linking the reader/writer 10 to the information processing terminal 30 and the server 40 is added (for example, by introducing a communication device or by installing software), an information processing system 1 according to an embodiment is realizable.

Furthermore, in an information processing system 1 according to an embodiment, since an existing IC card is usable as the IC card 20 as discussed above, existing means (equipment or a system) may be used to record authentication information onto that IC card. From the above points, according to an information processing system 1 according to an embodiment, when changing over from an existing system, the costs related to the changeover may be minimized.

Note that the examples discussed above describe examples in which the reader/writer 10 reports authentication information to the information processing terminal 30 when triggered by the reader/writer 10 entering/departing the communication range N2 of the information processing terminal 30. However, the information to be reported is not limited to authentication information, insofar as the information is relevant information for causing at least one of the information processing terminal 30 and the reader/writer 10 to execute a designated process when triggered by the reader/writer 10 entering/departing the communication range N2 of the information processing terminal 30. For example, information for establishing communication other than wireless communication between the reader/writer 10 and the information processing terminal 30 (for example, information for the information processing terminal 30 to access a designated network) may also be reported from the reader/writer 10 to the information processing terminal 30.

In addition, suitable devices may also be added to the reader/writer 10 according to the usage method of the reader/writer 10 or the type of information transmitted and received between the reader/writer 10 and the information processing terminal 30. For example, in the case of operating the reader/writer 10 by changes in the position and orientation of the reader/writer 10, a motion sensor (for example, an acceleration sensor or angular velocity sensor) may be provided with respect to the reader/writer 10. Also, as another example, in the case of causing the information processing terminal 30 to execute a designated process by reporting position information of the reader/writer 10 to the information processing terminal 30, a Global Positioning System (GPS) antenna may be provided with respect to the reader/writer 10.

The foregoing thus describes embodiments of the present disclosure in detail and with reference to the attached drawings. However, the technical scope of the present disclosure is not limited to such examples. It is clear to persons ordinarily skilled in the technical field of the present disclosure that various modifications or alterations may occur insofar as they are within the scope of the technical ideas stated in the claims, and it is to be understood that such modifications or alterations obviously belong to the technical scope of the present disclosure.

In addition, the advantageous effects described in this specification are merely for the sake of explanation or illustration, and are not limiting. In other words, instead of or in addition to the above advantageous effects, technology according to the present disclosure may exhibit other advantageous effects that are clear to persons skilled in the art from the description of this specification.

The present technology may be embodied as the following configurations, but is not limited thereto.

(1) An apparatus including:
a circuitry configured to:
initiate a reception of an information request that has been wirelessly transmitted from an information processing terminal;
initiate, based on the information request, an obtaining of an information wirelessly from an external communication device; and initiate a wireless transmission of the obtained information to the information processing terminal.

(2) The apparatus according to (1), wherein the apparatus maintains a connection request standby state for awaiting a receipt of a connection request from the information processing terminal.

(3) The apparatus according to (1) or (2), wherein the connection request standby state is a low power mode of operation.

(4) The apparatus according to any of (1) through (3), wherein, while the apparatus is in the connection request standby state, the apparatus is unable to successfully receive the information request from the information processing terminal.

(5) The apparatus according to any of (1) through (4), wherein upon reception of the connection request from the information processing terminal, the circuitry initiates a registration process for establishing wireless communication with the information processing terminal and the apparatus transitions state from the connection request standby state to a service available state, (6) The apparatus according to any of (1) through (5), wherein the apparatus receives the information request from the information processing terminal while the apparatus is in the service available state.

(7) The apparatus according to any of (1) through (6), wherein, subsequent to reception of the information request and while the apparatus remains in the service available state, the apparatus wirelessly obtains the information from the external communication device and the circuitry initiates the wireless transmission of the Obtained information to the information processing terminal.

(8) The apparatus according to any of (1) through (7), wherein the apparatus, while in the service available state, monitors whether or not the wireless communication with the information processing terminal is interrupted.

(9) The apparatus according to any of (1) through (8), wherein when the apparatus detects that the wireless communication with the information processing terminal is interrupted, the apparatus transitions state from the service available state to a reconnection request state.

(10) The apparatus according to any of (1) through (9), wherein when the apparatus is in the reconnection request state, the circuitry further initiates a transmission of a reconnection request for reestablishing the wireless communication to the information processing terminal.

(11) The apparatus according to any of (1) through (10), wherein when the apparatus receives a response to the reconnection request, the apparatus reestablishes the wireless communication with the information processing terminal and transitions state from the reconnection request state to the service available state.

(12) The apparatus according to any of (1) through (11), wherein the information request is received from the information processing terminal by using a first communication format, and the information is obtained from the external communication device by using a second communication format.

(13) The apparatus according to any of (1) through (12), wherein the first communication format is a Bluetooth or Wi-Fi wireless communication, and the second communication format is an NFC, wireless communication.

(14) The apparatus according to any of (1) through (13), wherein the first communication format and the second communication format have different ranges of communication.

(15) The apparatus according to any of (1) through (14), wherein the circuitry initiates the reception of the information request after the device is determined to have entered a communication range of the information processing terminal.

(16) The apparatus according to any of (1) through (15), wherein the obtained information includes an authentication information.

(17) The apparatus according to any of (1) through (16), wherein the apparatus sets a flag that indicates a current state of operation.

(18) The apparatus according to any of (1) through (17), wherein the current state of operation is one of a power-off state, a connection request standby state, a service available state, and a reconnection request state.

(19) The apparatus according to any of (1) through (18), wherein the apparatus obtains the information from the external communication device by sending a request for the information to the external communication device, and then receiving the information wirelessly from the external communication device.

(20) The apparatus according to any of (1) through (19), wherein the apparatus receives the information request from the information processing terminal while apparatus is in a standby state.

(21) An information processing method including:
receiving an information request that has been wirelessly transmitted from an information processing terminal;
obtaining, based on the information request, information from an external communication device wherein the information is received from the external communication device through wireless communication; and
wirelessly transmitting the obtained information to the information processing terminal.

(22) A non-transitory computer-readable medium having embodied there a program, which when executed by a computer causes the computer to perform a method, the method including:
receiving an information request that has been wirelessly transmitted from an information processing terminal;
obtaining, based on the information request, information from an external communication device wherein the information is received from the external communication device through wireless communication; and
wirelessly transmitting the obtained information to the information processing terminal.

(23) An information processing apparatus including: a circuitry configured to:
initiate a wireless transmission of an information request to an apparatus upon a detection that the apparatus has entered a communication range of the information processing apparatus;
initiate a reception of an authentication information, which is responsive to the information request and has been wirelessly transmitted from the apparatus; and
initiate an execution of an authentication process, based on the received authentication information, for granting access to a service executing on the information processing terminal.

(24) An information processing method including:
wirelessly transmitting an information request from an information processing apparatus to an apparatus upon a detection that the apparatus has entered a communication range of the information processing apparatus;
receiving an authentication information, which is responsive to the information request and has been wirelessly transmitted from the apparatus; and executing an authentication process, based on the received authentication information, for granting access to a service executing on the information processing terminal.

(25) A non-transitory computer-readable medium having embodied there a program, which when executed by a computer causes the computer to perform a method, the method including:

wirelessly transmitting an information request from an information processing apparatus to an apparatus upon a detection that the apparatus has entered a communication range of the information processing apparatus;

receiving an authentication information, which is responsive to the information request and has been wirelessly transmitted from the apparatus; and executing an authentication process, based on the received authentication information, for granting access to a service executing on the information processing terminal.

(26) A system including:

an information processing apparatus; and an apparatus, wherein the information processing apparatus includes a circuitry configured to:

initiate a wireless transmission of an information request to the apparatus upon a detection that the apparatus has entered a communication range of the information processing apparatus;

initiate a reception of an authentication information, which is responsive to the information request and has been wirelessly transmitted from the apparatus; and initiate an execution of an authentication process, based on the received authentication information, for granting access to a service executing on the information processing terminal, and wherein the apparatus includes a circuitry configured to:

initiate a reception of the information request that has been wirelessly transmitted from the information processing terminal;

initiate, based on the information request, an obtaining of the authentication information wirelessly from an external communication device; and initiate the wireless transmission of the obtained authentication information to the information processing terminal.

Additionally, the present technology may also be configured as below.

(1) An information processing device including:

an acquisition control unit that causes an acquisition unit for acquiring information related to authentication from an object to acquire the information related to authentication; and a communication control unit that, according to a state of wireless communication between a communication unit and an external device, controls operation of the communication unit, wherein the communication control unit, while in a state of the wireless communication being established, in a case of being requested to transmit information related to authentication from the external device, on the basis of the request, causes the communication unit to transmit the acquired information related to authentication to the external device via the wireless communication.

(2) The information processing device according to (1), wherein the communication control unit, in a case of going from a state in which the wireless communication is established to a state in which the wireless communication between the communication unit and the external device is interrupted, causes the communication unit to transmit a connection request addressed to the external device.

(3) The information processing device according to (1) or (2), wherein the communication control unit, in a case of receiving a connection request from the external device, executes a process by which the communication unit establishes the wireless communication with the external device.

(4) The information processing device according to any one of (1) to (4), wherein the acquisition control unit, on the basis of a request to transmit the information related to authentication from the external device, causes the acquisition unit, to acquire the information related to authentication.

(5) The information processing device according to any one of (1) to (4), including:

the acquisition unit.

(6) The information processing device according to (5), wherein the acquisition unit acquires the information related to authentication by communicating with the object.

(7) The information processing device according to (6), wherein communication between the object and the acquisition unit is contactless communication.

(8) The information processing device according to (5), wherein the object is a one- or multi-dimensional code, and the acquisition unit acquires the information related to authentication by capturing an image of the code.

(9) The information processing device according to any one of (1) to (7), including: the communication unit.

(10) An information processing system including:

a first information processing device; and a second information processing device, the first information processing device including an acquisition control unit that causes an acquisition unit for acquiring information related to authentication from an object to acquire the information related to authentication, and a communication control unit that controls wireless communication between a communication unit and the second information processing device according to a state of the wireless communication, wherein the communication control unit, while in a state of the wireless communication being established, in a case of being requested to transmit information related to authentication from the second information processing device, on the basis of the request, causes the communication unit to transmit the acquired information related to authentication to the second information processing device via the wireless communication, the second information processing device including an authentication control unit that executes a process related t logging into a designated system on the basis of the information related to authentication transmitted from the first information processing device.

(11) The information processing system according to (10), wherein the authentication control unit, while in a state of a user indicated by the information related to authentication being logged into the system, in a case of entering a state in which the Wireless communication with the first information processing device is interrupted, executes a process related to logging out the user from the system.

(12) The information processing system according to (11), wherein the authentication control unit, in a case where a state in which the wireless communication with the first information processing device is interrupted continues for at least a designated amount of time, executes a process related to logging out the user from the system.

(13) The information processing device according to any one of (10) to (12), wherein the communication control unit, in a case of going from a state in which the wireless communication is established to a state in which the wireless communication with the second information processing device is interrupted, causes the communication unit to transmit a connection request addressed to the second information processing device, and the authentication control unit, in a case of receiving the connection request, requests the first information processing device to transmit the information related to authentication.

(14) An information processing method including:

causing an acquisition unit for acquiring information related to authentication from an object to acquire the information related to authentication;

causing a processor, according to a state of wireless communication between a communication unit and an external device, to control operation of the communication unit; and while in a state of the wireless communication being established, in a case of being requested to transmit information related to authentication from the external device, on the basis of the request, causing the communication unit to transmit the acquired information related to authentication to the external device via the wireless communication.

(15) A program causing a computer to execute:

a step of causing an acquisition unit for acquiring information related to authentication from an object to acquire the information related to authentication;

a step of, according to a state of wireless communication between a communication unit and an external device, controlling operation of the communication unit; and a step of, while in a state of the wireless communication being established, in a case of being requested to transmit information related to authentication from the external device, on the basis of the request, causing the communication unit to transmit the acquired information related to authentication to the external device via the wireless communication.

(16) An information processing method including:

causing an acquisition unit for acquiring information related to authentication from an object to acquire the information related to authentication;

controlling wireless communication between a communication unit of a first information processing device and a second information processing device according to a state of the wireless communication;

while in a state of the wireless communication being established, in a case of being requested to transmit information related to authentication from the second information processing device, on the basis of the request, causing the communication unit to transmit the acquired information related to authentication to the second information processing device via the wireless communication; and causing the second information processing device to execute a process related to logging into a designated system on the basis of the information related to authentication transmitted from the first information processing device.

REFERENCE SIGNS LIST 1 information processing system
10 reader/writer
102 communication unit
104 communication control unit
106 communication information storage unit
108 acquisition control unit
110 acquisition unit
20 IC card
30, 30a to 30d information processing terminal
302 communication unit
304 communication control unit
306 UI
308 authentication control unit
40 server
50 database

The invention claimed is:

1. An apparatus comprising:
a circuitry configured to:
initiate a reception of an information request that has been wirelessly transmitted from an information processing terminal;
initiate, based on the information request, an obtaining of an information wirelessly from an external communication device; and
initiate a wireless transmission of the obtained information to the information processing terminal,
wherein the apparatus maintains a connection request standby state for awaiting a receipt of a connection request from the information processing terminal,
wherein upon reception of the connection request from the information processing terminal, the circuitry initiates a registration process for establishing wireless communication with the information processing terminal and the apparatus transitions state from the connection request standby state to a service available state, and
wherein, subsequent to reception of the information request and while the apparatus remains in the service available state, the apparatus wirelessly obtains the information from the external communication device and the circuitry initiates the wireless transmission of the obtained information to the information processing terminal.

2. The apparatus according to claim 1, wherein the connection request standby state is a low power mode of operation.

3. The apparatus according to claim 1, wherein, while the apparatus is in the connection request standby state, the apparatus is unable to successfully receive the information request from the information processing terminal.

4. The apparatus according to claim 1, wherein the apparatus receives the information request from the information processing terminal while the apparatus is in the service available state.

5. An apparatus comprising:
a circuitry configured to:
initiate a reception of an information request that has been wirelessly transmitted from an information processing terminal;
initiate, based on the information request, an obtaining of an information wirelessly from an external communication device; and
initiate a wireless transmission of the obtained information to the information processing terminal,
wherein the apparatus maintains a connection request standby state for awaiting a receipt of a connection request from the information processing terminal,
wherein upon reception of the connection request from the information processing terminal, the circuitry initiates a registration process for establishing wireless communication with the information processing terminal and the apparatus transitions state from the connection request standby state to a service available state, and wherein the apparatus, while in the service available state, monitors whether or not the wireless communication with the information processing terminal is interrupted.

6. The apparatus according to claim 5, wherein when the apparatus detects that the wireless communication with the information processing terminal is interrupted, the apparatus transitions state from the service available state to a reconnection request state.

7. The apparatus according to claim 6, wherein when the apparatus is in the reconnection request state, the circuitry further initiates a transmission of a reconnection request for reestablishing the wireless communication to the information processing terminal.

8. The apparatus according to claim 7, wherein when the apparatus receives a response to the reconnection request, the apparatus reestablishes the wireless communication with the information processing terminal and transitions state from the reconnection request state to the service available state.

9. The apparatus according to claim 1, wherein the information request is received from the information processing terminal by using a first communication format, and the information is obtained from the external communication device by using a second communication format.

10. The apparatus according to claim 9, wherein the first communication format is a Bluetooth or Wi-Fi wireless communication, and the second communication format is an NFC wireless communication.

11. The apparatus according to claim 9, wherein the first communication format and the second communication format have different ranges of communication.

12. The apparatus according to claim 1, wherein the circuitry initiates the reception of the information request after the device is determined to have entered a communication range of the information processing terminal.

13. The apparatus according to claim 1, wherein the obtained information comprises an authentication information.

14. The apparatus according to claim 1, wherein the apparatus sets a flag that indicates a current state of operation.

15. The apparatus according to claim 14, wherein the current state of operation is one of a power-off state, a connection request standby state, a service available state, and a reconnection request state.

16. The apparatus according to claim 1, wherein the apparatus obtains the information from the external communication device by sending a request for the information to the external communication device, and then receiving the information wirelessly from the external communication device.

17. The apparatus according to claim 1, wherein the apparatus receives the information request from the information processing terminal while the apparatus is in a standby state.

18. An information processing method comprising:
receiving an information request that has been wirelessly transmitted from an information processing terminal;
obtaining, based on the information request, information from an external communication device, wherein the information is received from the external communication device through wireless communication; and
wirelessly transmitting the obtained information to the information processing terminal,
wherein a connection request standby state is maintained for awaiting a receipt of a connection request from the information processing terminal,
wherein upon reception of the connection request from the information processing terminal, a registration process is initiated for establishing wireless communication with the information processing terminal and a transition is made from the connection request standby state to a service available state, and
wherein, subsequent to reception of the information request and while remaining in the service available state, the information is wirelessly obtained from the external communication device and the wireless transmission of the obtained information to the information processing terminal is initiated.

19. A non-transitory computer-readable medium having embodied there a program, which when executed by a computer causes the computer to perform a method, the method comprising:
receiving an information request that has been wirelessly transmitted from an information processing terminal;
obtaining, based on the information request, information from an external communication device, wherein the information is received from the external communication device through wireless communication; and
wirelessly transmitting the obtained information to the information processing terminal,
wherein a connection request standby state is maintained for awaiting a receipt of a connection request from the information processing terminal,
wherein upon reception of the connection request from the information processing terminal, a registration process is initiated for establishing wireless communication with the information processing terminal and a transition is made from the connection request standby state to a service available state, and
wherein, subsequent to reception of the information request and while remaining in the service available state, the information is wirelessly obtained from the external communication device and the wireless transmission of the obtained information to the information processing terminal is initiated.

20. A system comprising:
an information processing apparatus; and
an apparatus,
wherein the information processing apparatus comprises a circuitry configured to:
initiate a wireless transmission of an information request to the apparatus upon a detection that the apparatus has entered a communication range of the information processing apparatus;
initiate a reception of an authentication information, which is responsive to the information request and having been wirelessly transmitted from the apparatus; and
initiate an execution of an authentication process, based on the received authentication information, for granting access to a service executing on the information processing terminal, and
wherein the apparatus comprises a circuitry configured to:
initiate a reception of the information request that has been wirelessly transmitted from the information processing terminal;

initiate, based on the information request, an obtaining of the authentication information wirelessly from an external communication device; and initiate the wireless transmission of the obtained authentication information to the information processing terminal, wherein the apparatus maintains a connection request standby state for awaiting a receipt of a connection request from the information processing terminal, wherein upon reception of the connection request from the information processing terminal, the circuitry initiates a registration process for establishing wireless communication with the information processing terminal and the apparatus transitions state from the connection request standby state to a service available state, and wherein, subsequent to reception of the information request and while the apparatus remains in the service available state, the apparatus wirelessly obtains the information from the external communication device and the circuitry initiates the wireless transmission of the obtained information to the information processing terminal.

21. The apparatus according to claim 1, wherein the information processing terminal is external to and separate from the apparatus, wherein the information request is a request for information that is not currently stored within the apparatus at a time the information request is received by the apparatus, wherein the external communication device comprises an IC card, which is external to and separate from both the apparatus and the information processing terminal, and wherein the circuitry initiates the wireless transmission of the obtained information to the information processing terminal for causing the information processing terminal to execute a process related to login/logout with respect to a designated system, based upon the apparatus and the information processing terminal having entered within communication range of each other.

\* \* \* \* \*